United States Patent
Asai et al.

(10) Patent No.: US 8,831,007 B2
(45) Date of Patent: Sep. 9, 2014

(54) COMMUNICATION SYSTEM, METHOD OF CONTROLLING THE SAME, AND STORAGE MEDIUM

(71) Applicant: Canon Kabushiki Kaisha, Tokyo (JP)

(72) Inventors: Hitoshi Asai, Tokyo (JP); Tomoyuki Takada, Tokyo (JP); Wataru Tachiwa, Yokohama (JP); Naoto Takahashi, Saitama (JP); Makoto Umehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/629,407

(22) Filed: Sep. 27, 2012

(65) Prior Publication Data
US 2013/0090762 A1    Apr. 11, 2013

(30) Foreign Application Priority Data

Oct. 7, 2011    (JP) .................................. 2011-223454

(51) Int. Cl.
*H04L 12/28* (2006.01)
*H04J 3/06* (2006.01)
*H04L 12/40* (2006.01)

(52) U.S. Cl.
CPC ......... *H04L 12/40013* (2013.01); *H04J 3/0658* (2013.01); *H04J 3/062* (2013.01)
USPC .................................... 370/395.62

(58) Field of Classification Search
None
See application file for complete search history.

(56) References Cited

U.S. PATENT DOCUMENTS

| | | | | |
|---|---|---|---|---|
| 5,590,116 | A * | 12/1996 | Zhang | 370/253 |
| 5,832,309 | A * | 11/1998 | Noe et al. | 710/61 |
| 6,665,316 | B1 * | 12/2003 | Eidson | 370/509 |
| 7,826,519 | B1 * | 11/2010 | Tsai et al. | 375/219 |
| 2004/0119516 | A1 * | 6/2004 | Kim | 327/158 |
| 2008/0143637 | A1 | 6/2008 | Sunahara et al. | |
| 2009/0022255 | A1 * | 1/2009 | Kanekawa et al. | 375/356 |
| 2009/0290668 | A1 * | 11/2009 | Nishine | 375/356 |
| 2010/0177666 | A1 * | 7/2010 | Cheng et al. | 370/254 |
| 2012/0011217 | A1 * | 1/2012 | Weng et al. | 709/209 |
| 2012/0027026 | A1 * | 2/2012 | Duwel et al. | 370/465 |
| 2012/0063296 | A1 * | 3/2012 | Wang et al. | 370/216 |
| 2012/0117180 | A1 * | 5/2012 | Ranasinghe | 709/208 |
| 2013/0039359 | A1 * | 2/2013 | Bedrosian | 370/350 |

FOREIGN PATENT DOCUMENTS

| | | |
|---|---|---|
| JP | 62-072250 A | 4/1987 |
| JP | 09-029671 A | 2/1997 |
| JP | 11-252144 A | 9/1999 |
| JP | 2003-209556 A | 7/2003 |
| JP | 2006-094302 A | 4/2006 |
| JP | 2008-145902 A | 6/2008 |
| JP | 2009-148845 A | 7/2009 |

OTHER PUBLICATIONS

U.S. Appl. No. 13/646,262, filed Oct. 5, 2012.
U.S. Appl. No. 13/646,103, filed Oct. 5, 2012.

* cited by examiner

*Primary Examiner* — Otis L Thompson, Jr.
(74) *Attorney, Agent, or Firm* — Fitzpatrick, Cella, Harper & Scinto

(57) ABSTRACT

A communication system including a parent station and a plurality of child stations, the parent station and the plurality of child stations being line-connected or loop-connected in a plurality of stages, and the parent station comprises a decision unit configured to decide, based on information representing states of the plurality of child stations, which one a first data relay method of transmitting data to a subsequent station in accordance with a clock reproduced from data received from a preceding station and a second data relay method of transmitting data to the subsequent station in accordance with a local clock generated in a local station should be employed by each of the plurality of child stations.

21 Claims, 28 Drawing Sheets

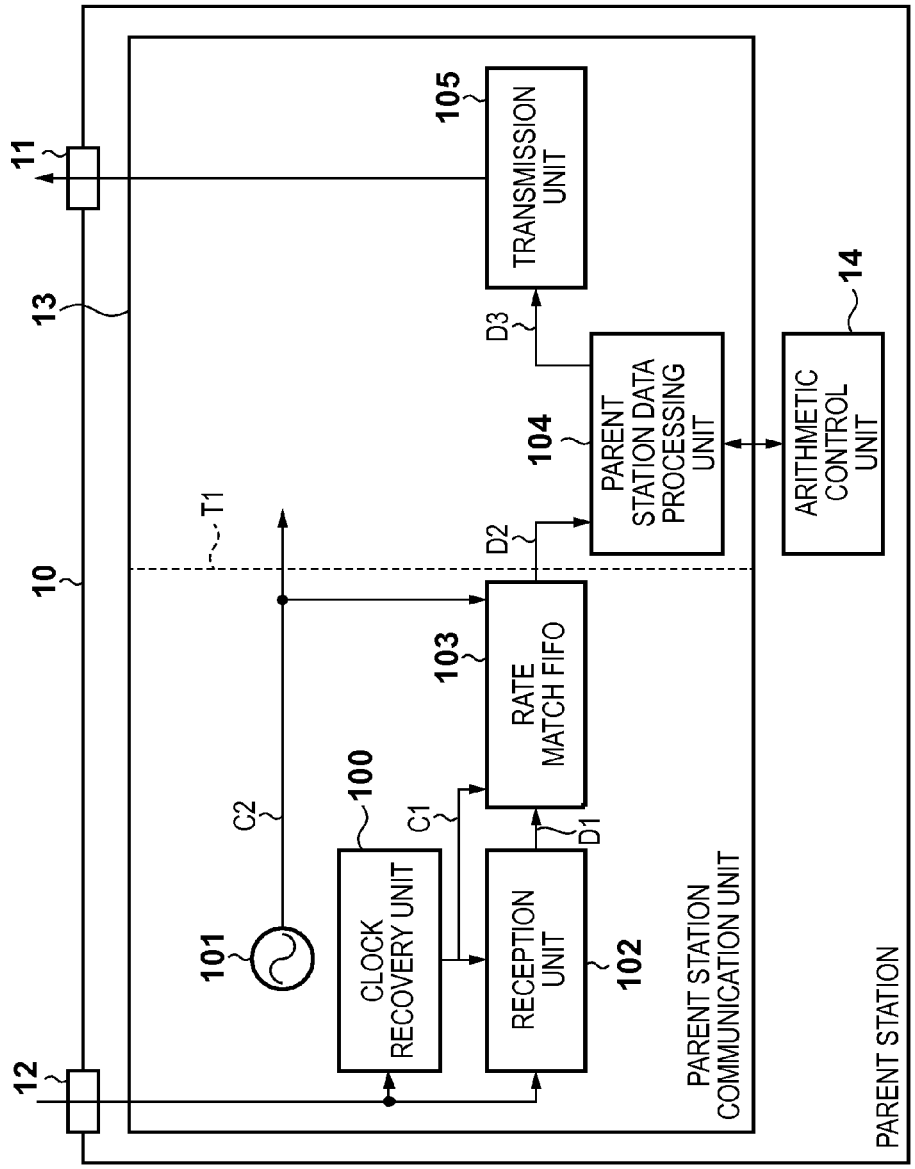

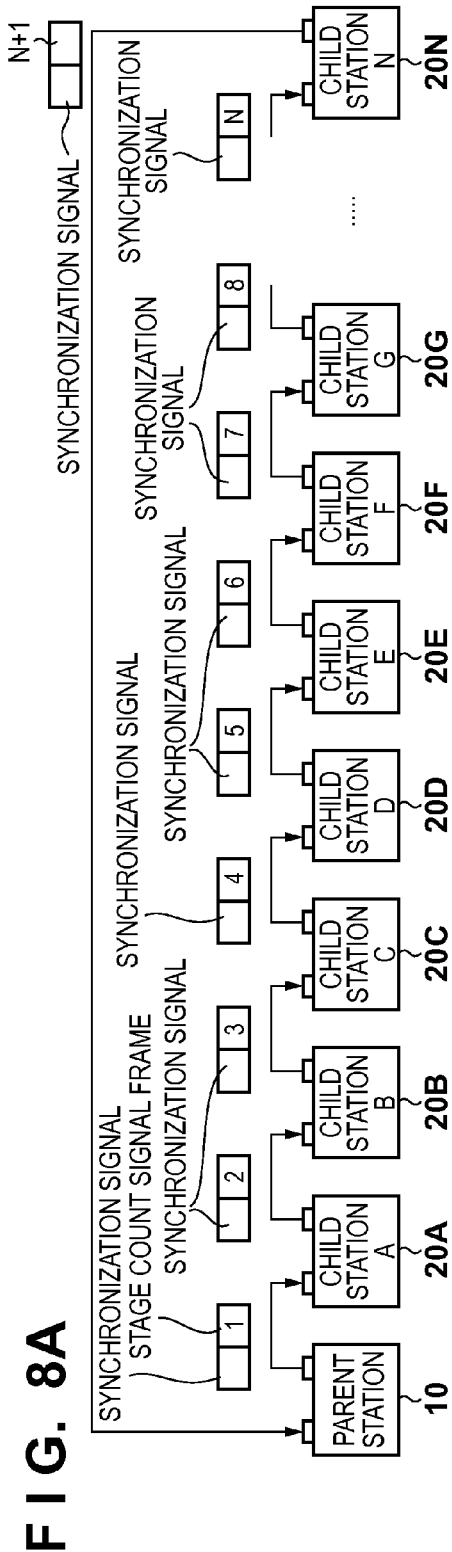
F I G. 8A
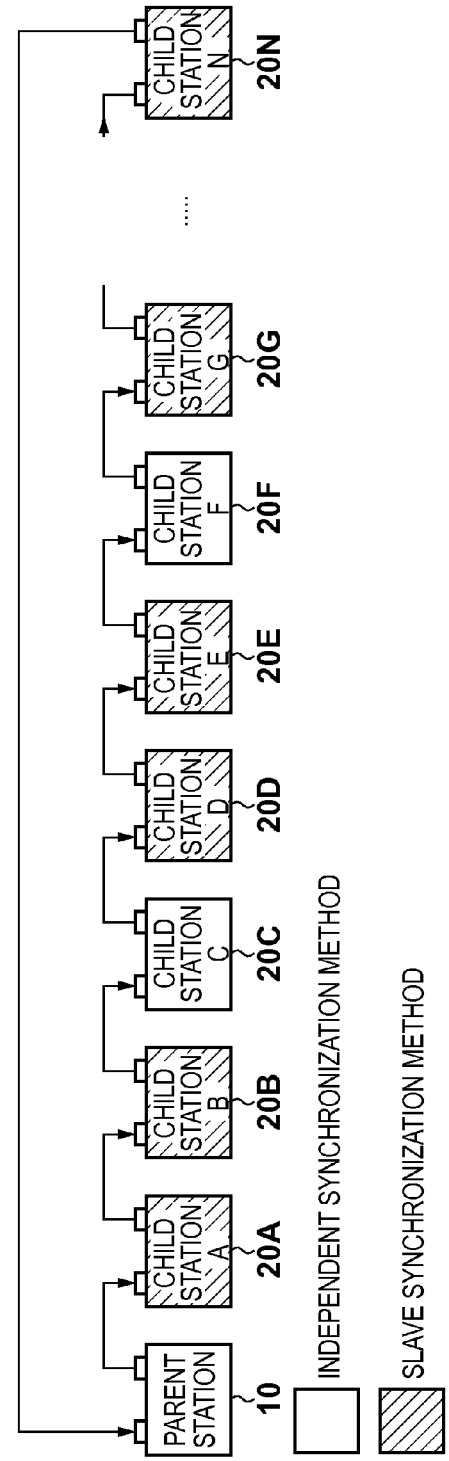
F I G. 8B

FIG. 9

| NUMBER OF RELAY STATIONS | SYNCHRONIZATION METHOD |
|---|---|
| 1 | SLAVE SYNCHRONIZATION METHOD |
| 2 | SLAVE SYNCHRONIZATION METHOD |
| 3 | INDEPENDENT SYNCHRONIZATION METHOD |
| 4 | SLAVE SYNCHRONIZATION METHOD |
| 5 | SLAVE SYNCHRONIZATION METHOD |
| 6 | INDEPENDENT SYNCHRONIZATION METHOD |
| 7 | SLAVE SYNCHRONIZATION METHOD |
| ⋮ | ⋮ |
| N | SLAVE SYNCHRONIZATION METHOD |

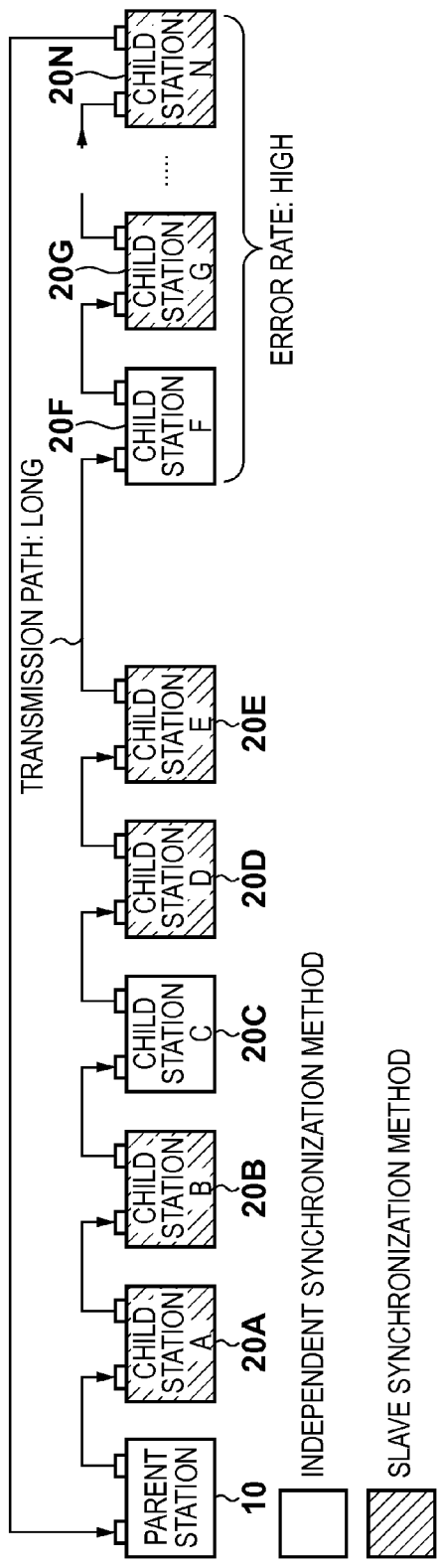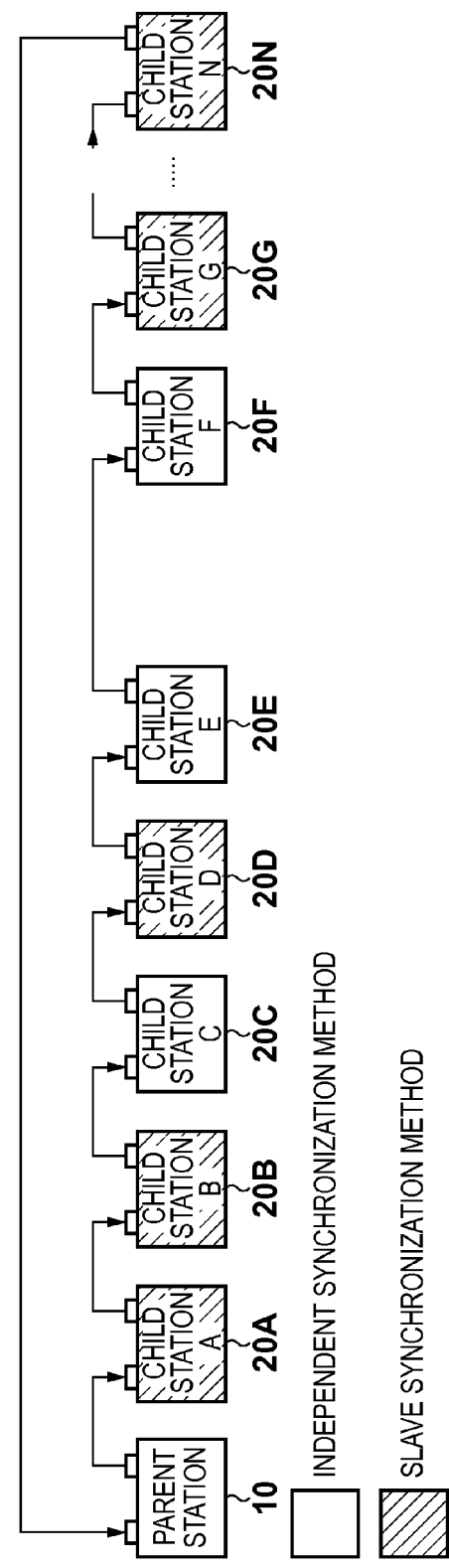

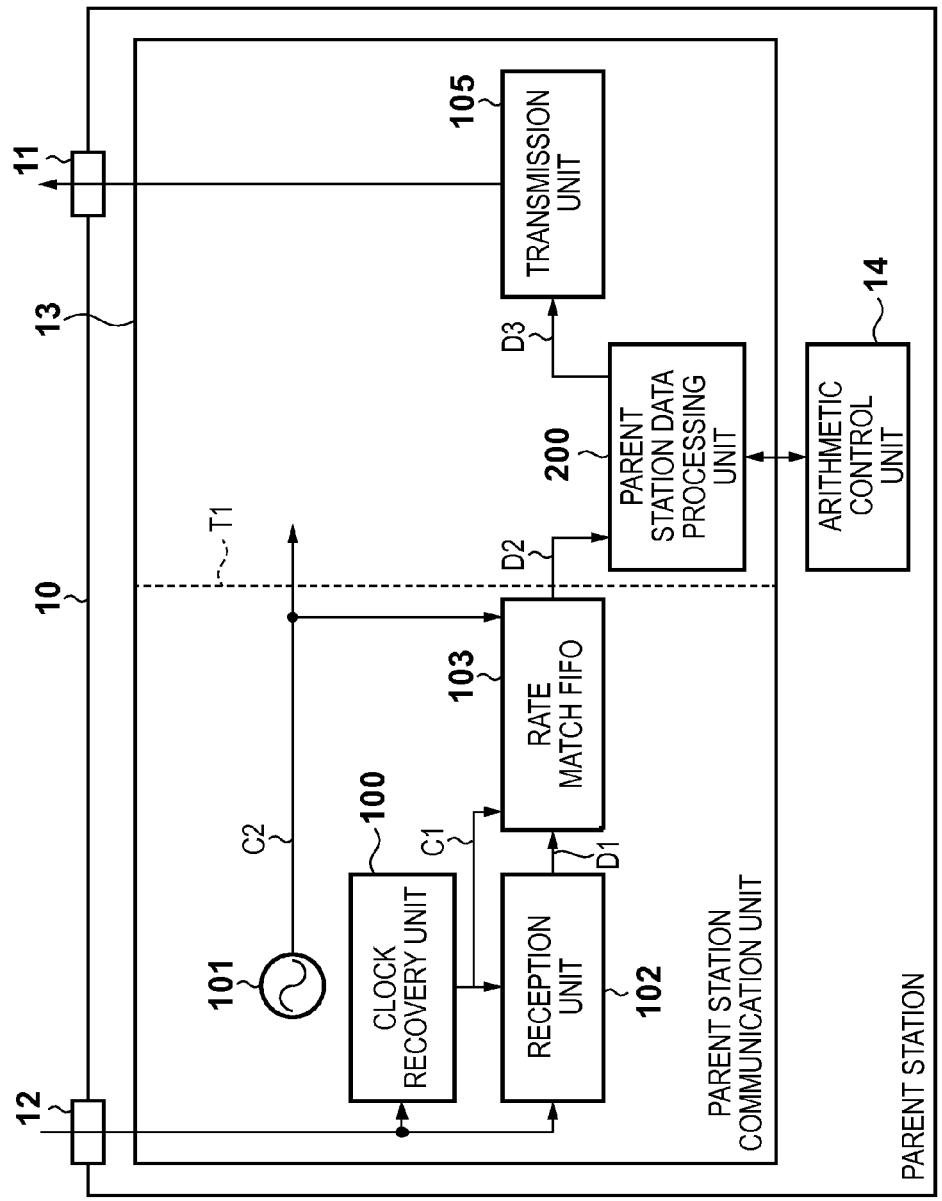

FIG. 15

| NUMBER OF RELAY STATIONS | SYNCHRONIZATION METHOD |
|---|---|
| 1 | SLAVE SYNCHRONIZATION METHOD |
| 2 | SLAVE SYNCHRONIZATION METHOD |
| 3 | INDEPENDENT SYNCHRONIZATION METHOD |
| 4 | SLAVE SYNCHRONIZATION METHOD |
| 5 | INDEPENDENT SYNCHRONIZATION METHOD |
| 6 | INDEPENDENT SYNCHRONIZATION METHOD |
| 7 | SLAVE SYNCHRONIZATION METHOD |
| ⋮ | ⋮ |
| N | SLAVE SYNCHRONIZATION METHOD |

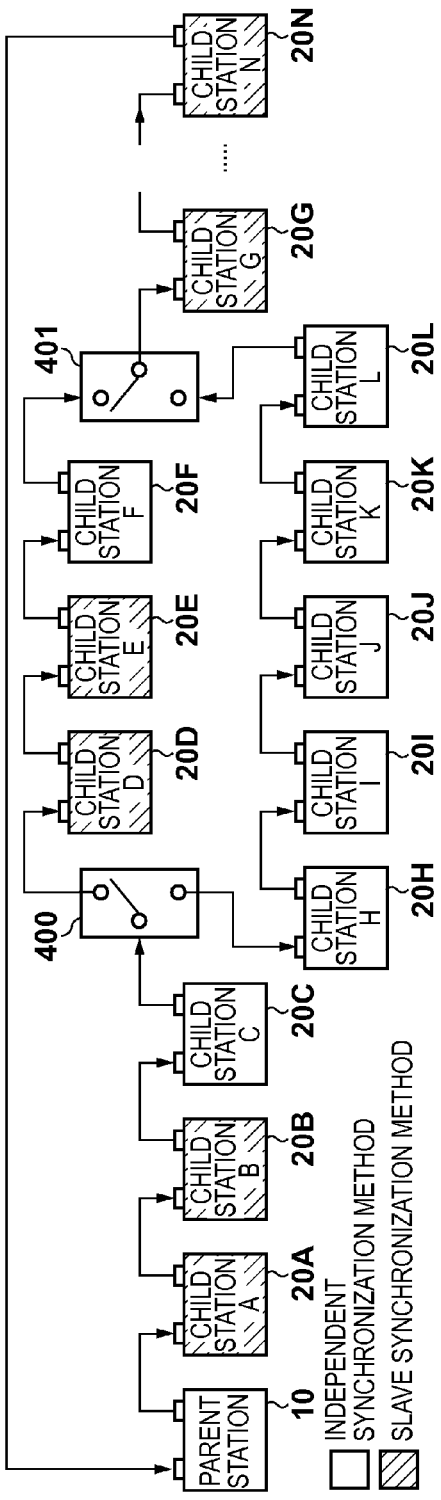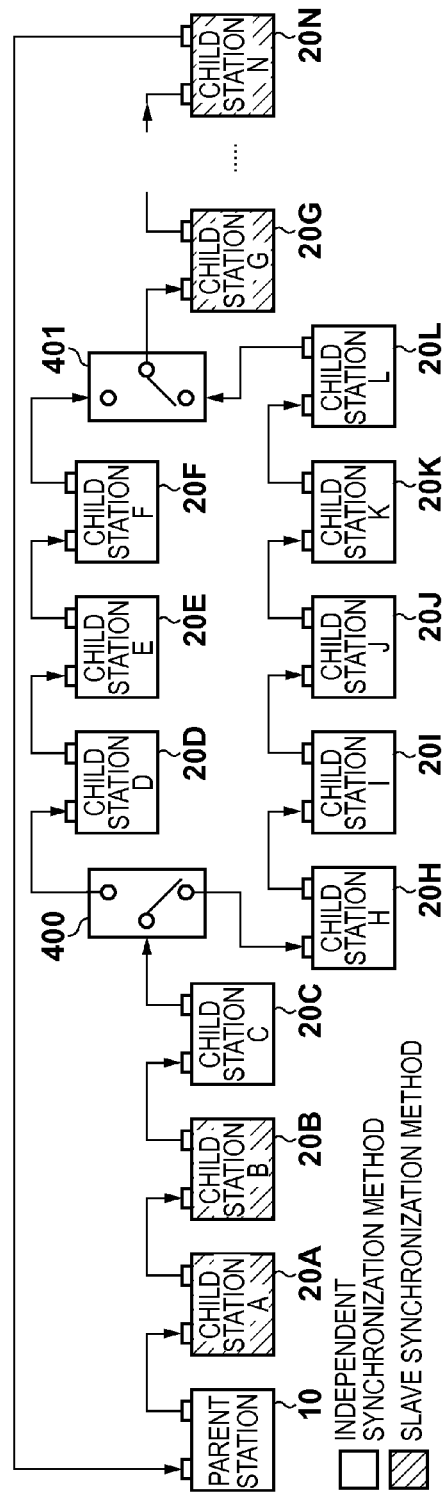

F I G. 19

| NUMBER OF RELAY STATIONS | SYNCHRONIZATION METHOD |
|---|---|
| 1 | SLAVE SYNCHRONIZATION METHOD |
| 2 | SLAVE SYNCHRONIZATION METHOD |
| 3 | INDEPENDENT SYNCHRONIZATION METHOD |
| 4 | SLAVE SYNCHRONIZATION METHOD |
| 5 | SLAVE SYNCHRONIZATION METHOD |
| 6 | INDEPENDENT SYNCHRONIZATION METHOD |
| 7 | SLAVE SYNCHRONIZATION METHOD |
| ⋮ | ⋮ |
| N | SLAVE SYNCHRONIZATION METHOD |
| N+1 | INDEPENDENT SYNCHRONIZATION METHOD |
| N+2 | SLAVE SYNCHRONIZATION METHOD |

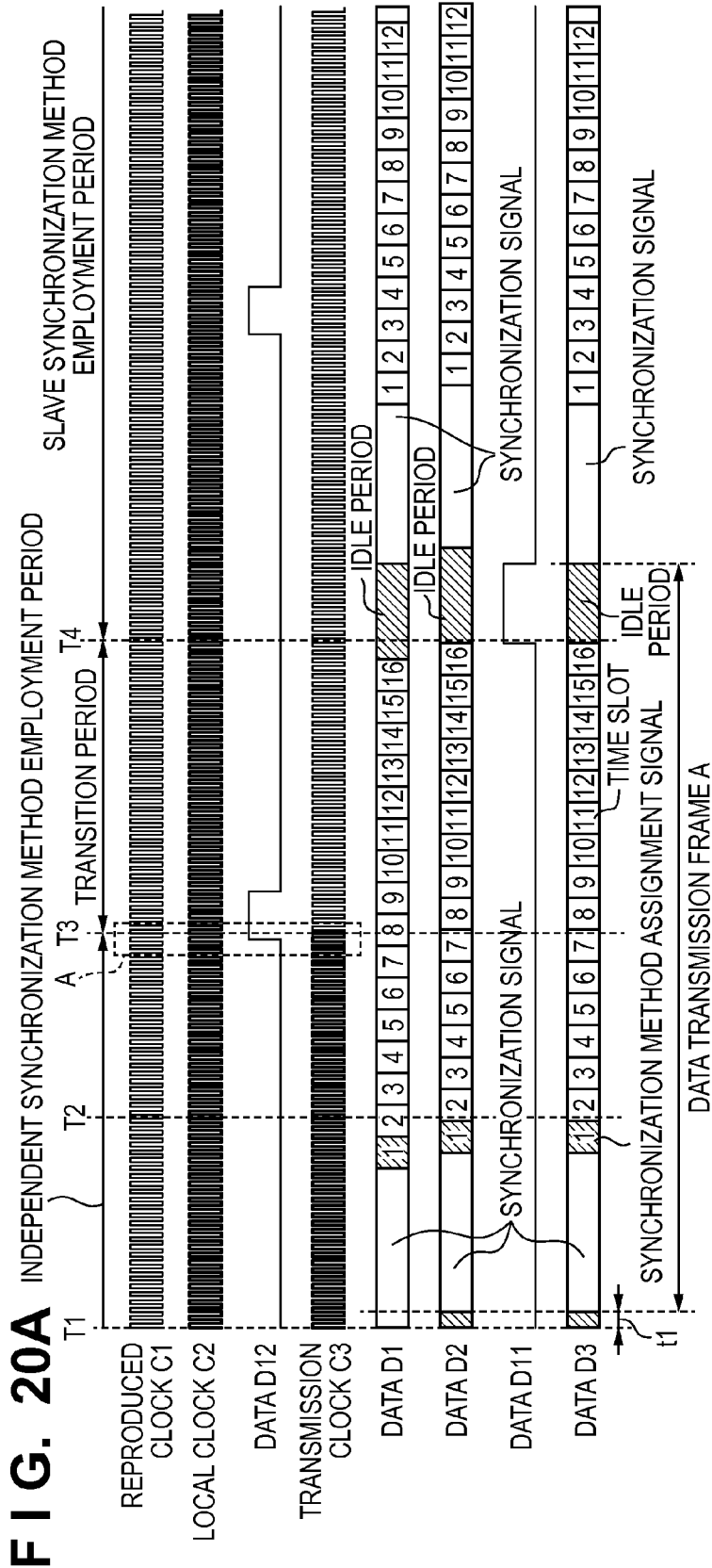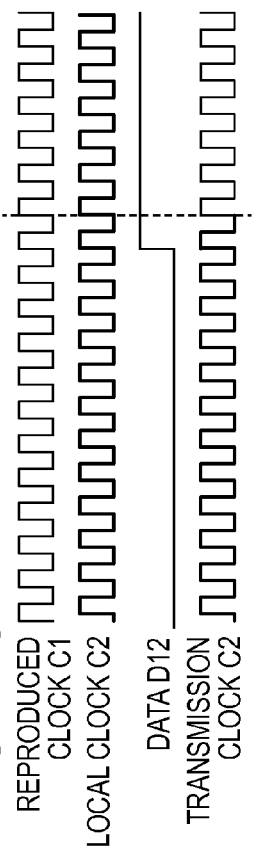

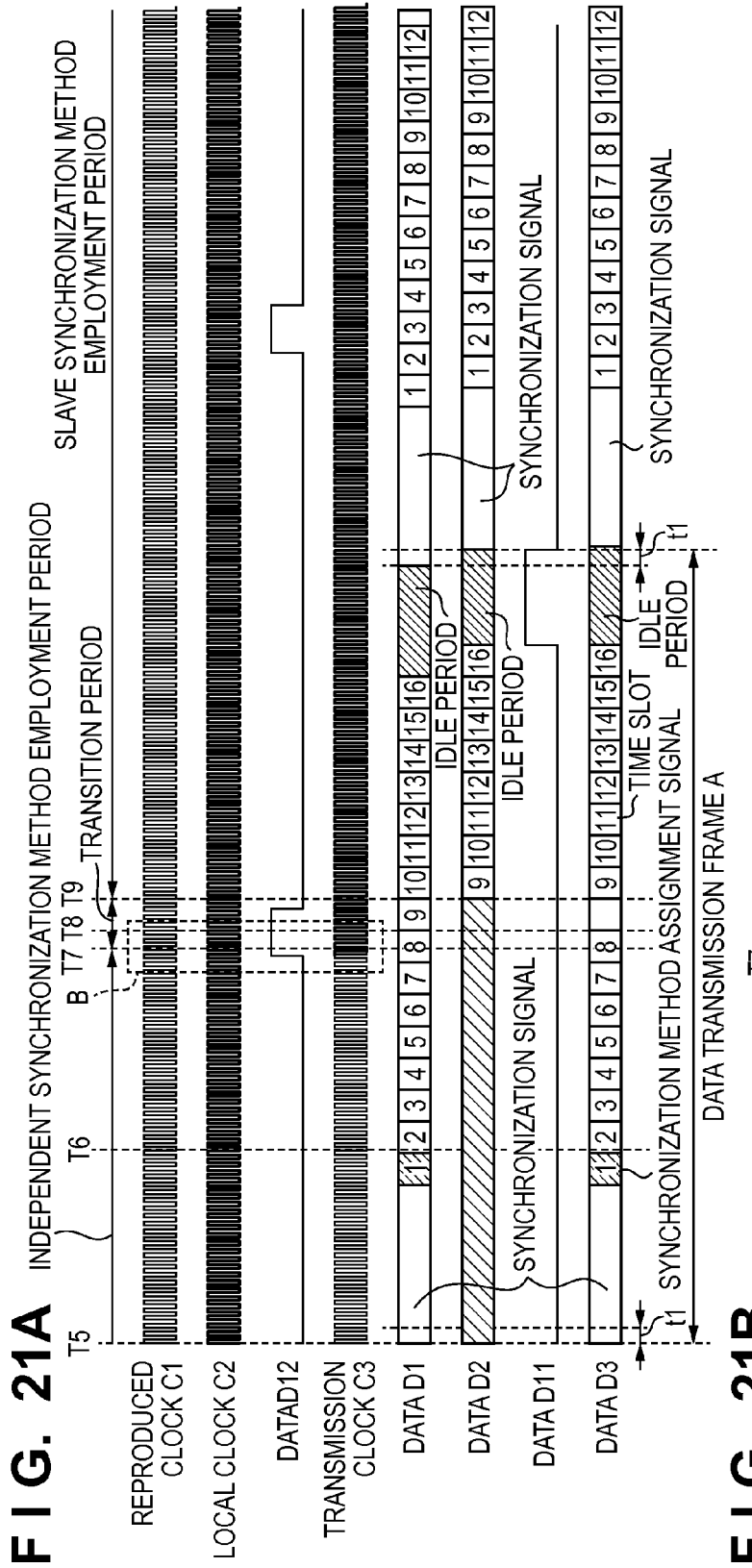
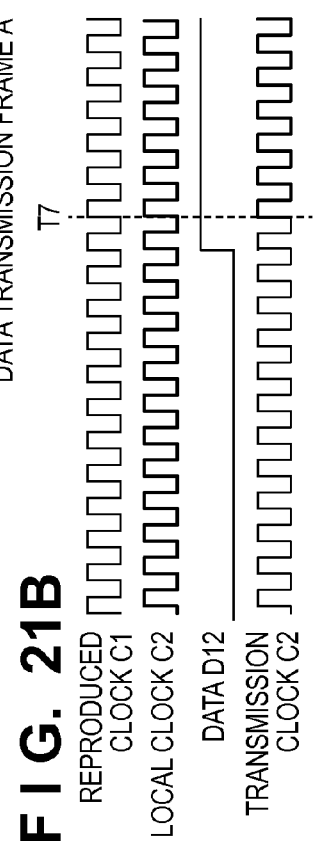
FIG. 21A
FIG. 21B

COMMUNICATION SYSTEM, METHOD OF CONTROLLING THE SAME, AND STORAGE MEDIUM

BACKGROUND OF THE INVENTION

1. Field of the Invention

The present invention relates to a communication system, a method of controlling the same, and a storage medium.

2. Description of the Related Art

A control system for industrial equipment or the like generally includes an arithmetic processing unit (CPU or the like) and a plurality of sensors and actuators. A sensor acquires external information about a current value, and outputs it to the arithmetic processing unit. The arithmetic processing unit calculates the deviation from a target value based on the external information, and outputs a correction value thereof to the actuator. The actuator is driven based on the correction value. The control system achieves a desired operation by periodically repeating the above-described feedback control. One of the control systems is a robot system represented by an industrial robot.

Japanese Patent Laid-Open No. 09-029671 discloses a robot system which combines and connects mechanically and electrically independent joint modules, and transmits/receives information concerning operation control using communication units included in the joint modules, thereby controlling the overall operation. Note that as shown in FIG. 2 of Japanese Patent Laid-Open No. 09-029671, each joint module includes a communication unit and constitutes a network together with other joint modules. With this structure, a flexible robot system is constituted, which can do recombination in accordance with a change in operation contents even when a number of joint modules are combined.

Japanese Patent Laid-Open No. 2009-148845 discloses a robot system that recognizes operation contents, selects an appropriate end effector in accordance with the operation contents, and autonomously exchanges the end effector.

The period at which feedback control is performed is called a sampling period. Generally, when the sampling period is shortened, a control system capable of performing a fast and precise operation can be constituted. However, shortening the sampling period is restricted by several factors. One of the factors is a dead time. The dead time is a time delay that occurs in the control system. More specifically, it is a time delay necessary until a sensor acquires external information, and an actuator is driven based on a correction value calculated from the external information. The dead time needs to be sufficiently short as compared to the sampling period. If the dead time is too long relative to the sampling period to neglect, the feedback control is unstable. That is, to constitute a control system for implementing a fast and precise operation, the dead time needs to be made as short as possible. The dead time is represented by the sum of the transmission time necessary for information transmission and the arithmetic time necessary for the arithmetic processing unit to calculate the correction value from the external information.

The most simple arrangement for minimizing the dead time from the viewpoint of signal transmission is an arrangement that connects the arithmetic processing unit and all the sensors and actuators by wires in a one-to-one correspondence. This arrangement allows to greatly shorten the transmission time, which is, shorten the dead time. In this arrangement, however, cables are required as many as the sensors and actuators. The number of cables is enormous in a control system including a number of sensors and actuators. This poses problems such as an increase in the cable cost, complex cable leading, and the influence of the weight and vibration of the cables on control. To prevent this, networking the wires between the arithmetic processing unit and the sensors to save the wires has widely been addressed.

Japanese Patent Laid-Open No. 2006-94302 discloses a control system that line-connects a parent station incorporating an arithmetic processing unit and a child station to which a sensor and an actuator are connected. To form a network and shorten the dead time, the time (to be referred to as a "data relay time" hereinafter) necessary for each terminal station to relay data needs to be as short as possible.

Terminal stations connected to a network use an independent synchronization method and a slave synchronization method as synchronization methods. In the independent synchronization method, a station transmits data to a lower station using a clock oscillated by a locally provided clock oscillation unit, as shown in FIG. 10 of Japanese Patent Laid-Open No. 11-252144. For this reason, in the independent synchronization method, a rate match FIFO needs to be provided to absorb the transmission rate difference generated by the frequency deviation between the local clock and a reproduced clock reproduced by a clock recovery unit. On the other hand, in the slave synchronization method, a station transmits data to a lower station using a reproduced clock reproduced by a clock recovery unit, as shown in FIG. 6 of Japanese Patent Laid-Open No. 2003-209556. For this reason, in the slave synchronization method, no rate match FIFO needs to be provided, unlike the independent synchronization method.

When the two methods are compared from the viewpoint of shortening the dead time, it is preferable to employ not the independent synchronization method but the slave synchronization method. This is because the slave synchronization method, which need not arrange any rate match FIFO, can make the delay in data relay shorter by the time required for passing through the rate match FIFO, as compared to the independent synchronization method.

In the slave synchronization method, however, the total number of child stations connectable to the network is restricted, unlike the independent synchronization method. This is because in the slave synchronization method that uses a reproduced clock as the transmission clock, a jitter amount is added every time data passes through a child station, and as a result, a data error occurs through terminal stations of a predetermined number or more of stages. Each of Japanese Patent Laid-Open Nos. 62-72250 and 2008-145902 discloses a technique of increasing the total number of connectable child stations. Japanese Patent Laid-Open No. 62-72250 discloses a communication system in which a bypass is provided to transmit a clock between child stations that are not adjacent, and a clock generated in the child station closer to the parent station viewed from the data transmission direction is used the transmission clock of the child station far away from the parent station. Japanese Patent Laid-Open No. 2008-145902 discloses a communication system in which a clock transmission path for transmitting a clock reproduced in the child station closest to the parent station is provided, and each child station uses, as the transmission clock, one of a clock reproduced from a communication signal and the clock from the clock transmission path. Using these techniques makes it possible to suppress the jitter amount added every time data passes through a child station, that is, increase the total number of child stations connectable to the network, as compared to the simple slave synchronization method.

In Japanese Patent Laid-Open Nos. 62-72250 and 2008-145902, however, to increase the total number of child stations connectable to the network, a considerable number of cables need to be provided in accordance with the increase in the number of child stations in addition to those for data transmission. This poses problems such as an increase in the cable cost, complex cable leading, and the influence of the weight and vibration of the cables on control. From the opposite viewpoint, the smaller the number of cables other than those for data transmission is, the more the total number of child stations connectable to the network is restricted. That is, the total number of child stations that are connectable to the network and the wire saving of cables have a tradeoff relationship.

SUMMARY OF THE INVENTION

In consideration of the above-described problems, the present invention provides a data transmission technique capable of connecting a number of child stations to a network while decreasing the total number of cables.

According to one aspect of the present invention, there is provided a communication system including a parent station and a plurality of child stations, the parent station and the plurality of child stations being line-connected or loop-connected in a plurality of stages, and the parent station comprising a decision unit configured to decide, based on information representing states of the plurality of child stations, which one a first data relay method of transmitting data to a subsequent station in accordance with a clock reproduced from data received from a preceding station and a second data relay method of transmitting data to the subsequent station in accordance with a local clock generated in a local station should be employed by each of the plurality of child stations.

According to one aspect of the present invention, there is provided a method of controlling a communication system including a parent station and a plurality of child stations, the parent station and the plurality of child stations being line-connected or loop-connected in a plurality of stages, the method comprising: in the parent station, deciding, based on information representing states of the plurality of child stations, which one a first data relay method of transmitting data to a subsequent station in accordance with a reproduced clock reproduced from data received from a preceding station and a second data relay method of transmitting data to the subsequent station in accordance with a local clock generated in a local station should be employed by each of the plurality of child stations.

Further features of the present invention will be apparent from the following description of exemplary embodiments with reference to the attached drawings.

BRIEF DESCRIPTION OF THE DRAWINGS

FIGS. 3A and 3B are block diagrams showing the internal arrangements of a parent station and a child station according to the first embodiment, respectively;

FIGS. 8A and 8B are views for explaining an operation according to the first embodiment;

FIG. 9 is a view showing table information output as a synchronization method assignment signal according to the first embodiment;

FIGS. 10A and 10B are views for explaining an operation according to the second embodiment;

FIGS. 11A and 11B are block diagrams showing the internal arrangements of a parent station and a child station according to the second embodiment, respectively;

FIG. 15 is a view showing table information output as a synchronization method assignment signal according to the second embodiment;

FIGS. 16A to 16C are views for explaining an operation according to the third embodiment;

FIG. 19 is a view showing table information output as a synchronization method assignment signal according to the third embodiment;

FIGS. 20A and 20B are views for explaining the operation of a child station that switches from the independent synchronization method to the slave synchronization method during a data transmission phase according to the third embodiment;

FIGS. 21A and 21B are views for explaining the operation of a child station that switches from the slave synchronization method to the independent synchronization method during the data transmission phase according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
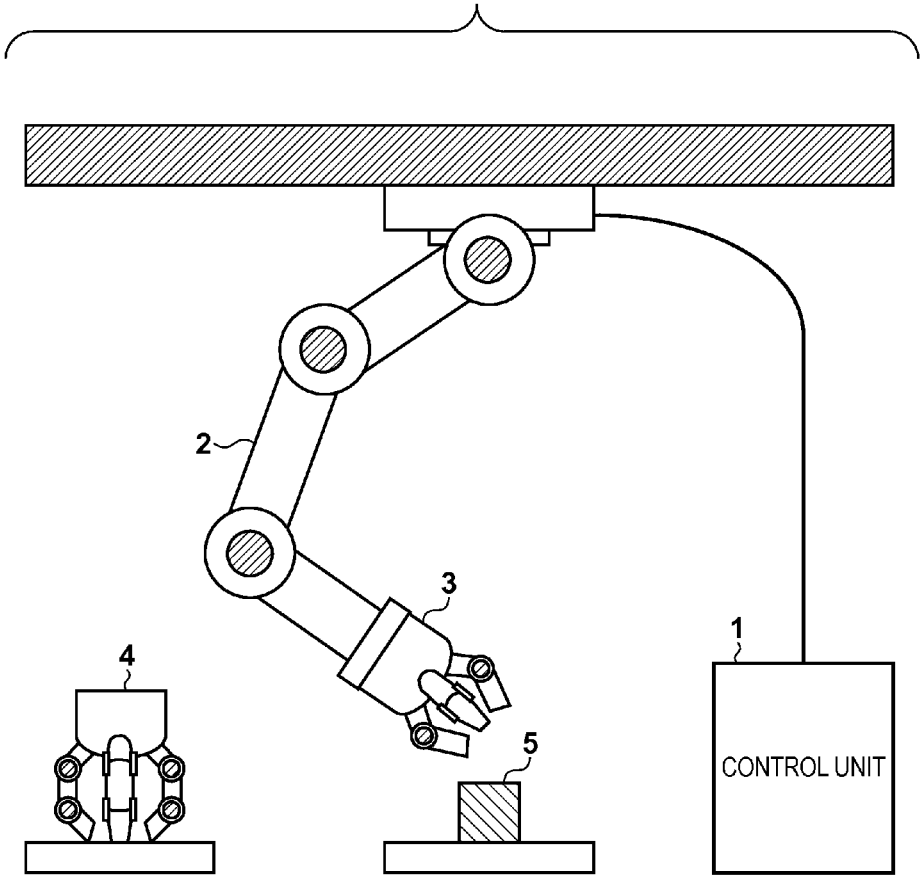
FIG. 1 is a view showing the outline of a robot system to which the present invention is applicable.

FIG. 1 is a view showing the outline of a robot system to which the present invention is applicable. A control unit 1 controls the operation of the entire robot system. The control unit 1 also outputs information such as an operation progress or an error log to a management system (not shown) as needed. A robot arm 2 is connectable to an end effector 3 or 4 to be described later and executes a predetermined operation. The end effector 3 is attached to the distal end of the robot arm 2, as shown in FIG. 1, and performs a predetermined operation for a work 5. The end effector 4 is also attached to the distal end of the robot arm 2, like the end effector 3, and performs a predetermined operation different from that of the end effector 3. That is, each end effector has a predetermined structure corresponding to a predetermined operation. This robot system is assumed to autonomously exchange the end effectors 3 and 4 without labor based on in accordance with operation contents.

Figure 2:
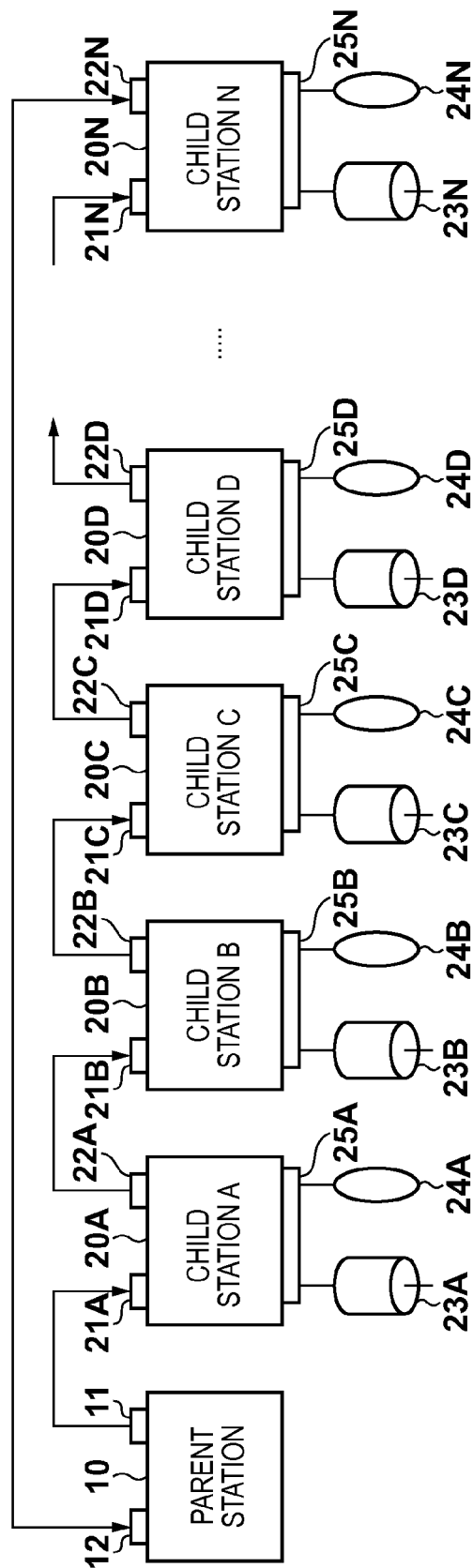
FIG. 2 is a view showing a network configuration according to the first embodiment.

FIG. 2 is a view showing a network configuration according to this embodiment. A parent station and a plurality of child stations are line-connected or loop-connected in a plurality of stages. An example of line connection will be described later with reference to FIG. 22. A parent station 10 is incorporated in the control unit 1 shown in FIG. 1. Each of a plurality of child stations 20 is incorporated in the robot arm 2 or the end effector 3 or 4 shown in FIG. 1.

The parent station 10 includes child station connectors 11 and 12. The parent station 10 is connected to an upper station connector 21A of a child station 20A to be described later via the child station connector 11, and to a lower station connector 22N of a child station 20N to be described later via the child station connector 12. Each child station 20 includes an upper station connector 21 and a lower station connector 22 and is connected to the upper and lower stations via the connectors. The parent station 10 and the child stations 20 are connected in the above-described way to form a loop-type network as shown in FIG. 2. In the example shown in FIG. 2, one parent station 10 and the child stations 20A, 20B, 20C, 20D, . . . , 20N exist. The child station 20A includes the upper station connector 21A and a lower station connector 22A. Similarly, the child stations 20B, 20C, 20D, . . . , 20N include upper station connectors 21B, 21C, 21D, . . . , 21N and lower station connectors 22B, 22C, 22D, . . . , 22N, respectively.

An actuator 23 and a sensor 24 are connected to each child station 20 via a device connector 25. The actuator 23 is, for example, a servo-controlled motor. The sensor 24 is, for example, an encoder that detects an angle/position. Each child station drives the actuator 23 based on a driving signal output from the parent station 10. In addition, each child station outputs external information acquired by the sensor 24 to the parent station 10 as a sensor signal. The parent station 10 incorporates an arithmetic processing unit to be described later. The arithmetic processing unit calculates a deviation from a target value based on the senor signal output from each child station. The arithmetic processing unit outputs a correction value of the deviation to each child station as a driving signal. The robot system can obtain a desired operation by performing the above-described feedback control.

In the example shown in FIG. 2, the child station 20A includes an actuator 23A, a sensor 24A, and a device connector 25A. Similarly, the child stations 20B, 20C, 20D, . . . , 20N include actuators 23B, 23C, 23D, . . . , 23N, sensors 24B, 24C, 24D, . . . , 24N, and device connectors 25B, 25C, 25D, . . . , 25N, respectively.

In this embodiment, an arrangement will be explained, which executes an initial sequence before transmission of valid data such as a sensor signal or a driving signal such that the parent station 10 grasps the number of relay stations of each child station and decides the synchronization method of each child station. That is, the parent station decides, based on information representing the states of the plurality of child stations, which one of the slave synchronization method (first data relay method) of transmitting data to the subsequent terminal station in accordance with a reproduced clock reproduced from data received from the preceding terminal station and the independent synchronization method (second data relay method) of transmitting data to the subsequent terminal station in accordance with a local clock generated in the local station should be employed by each of the plurality of child stations. In this embodiment, the information representing the states of the plurality of child stations is the number of relay stations for relaying data transmitted from the parent station for each child station.

Figure 3B:
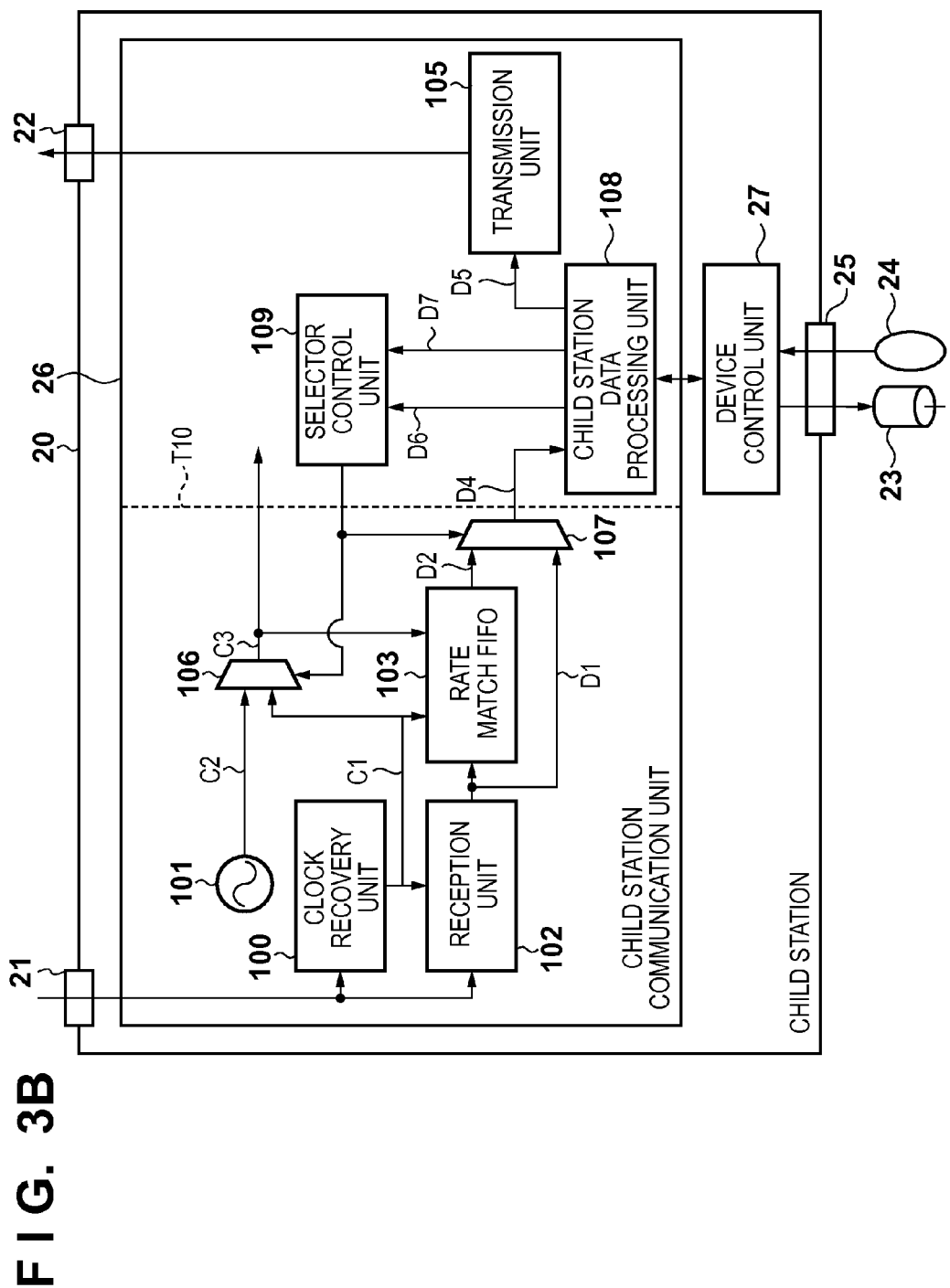

FIGS. 3A and 3B are block diagrams showing the internal arrangements of the parent station 10 and the child station 20 according to this embodiment, respectively.

<Arrangement of Parent Station>

FIG. 3A is a block diagram showing the internal arrangement of the parent station 10 according to this embodiment. The parent station 10 includes the child station connectors 11 and 12, a parent station communication unit 13, and an arithmetic control unit 14.

The parent station communication unit 13 includes a clock recovery unit 100, a local clock oscillation unit 101, a reception unit 102, a rate match FIFO 103, a parent station data processing unit 104, and a transmission unit 105.

The clock recovery unit 100 reproduces a clock from a communication signal output from the preceding terminal station (the child station 20N for the parent station 10), and outputs a reproduced clock C1. The local clock oscillation unit 101 oscillates a local clock C2 having almost the same frequency as that of the reproduced clock C1.

The reception unit 102 receives the communication signal in synchronism with the reproduced clock C1, performs predetermined decoding processing, and outputs data D1. The predetermined decoding processing means decoding processing (for example, Manchester decoding or 5B4B conversion/10B8B conversion) for facilitating clock recovery. Note that the decoding processing is preferably performed but is not indispensable.

The rate match FIFO 103 temporarily stores the data D1 in synchronism with the reproduced clock C1, and outputs data D2 by first-in first-out in synchronism with the local clock C2. The rate match FIFO 103 is provided to absorb the transmission rate difference generated by the frequency deviation between the reproduced clock C1 and the local clock C2. The parent station data processing unit 104 processes various kinds of data in the parent station 10. Details of processing of the parent station data processing unit 104 will be described later with reference to FIG. 4A.

The transmission unit 105 performs predetermined coding processing for various kinds of input signals, and outputs them. The predetermined coding processing means coding processing (for example, Manchester coding or 4B5B conversion/8B10B conversion) for facilitating clock recovery. The coding processing executed by the transmission unit 105 corresponds to the decoding processing executed by the reception unit 102.

The arithmetic control unit 14 calculates the deviation from a target value based on a sensor signal output from each child station, and outputs a correction value thereof as a driving signal. Note that each block illustrated on the right side of a dotted line T1 in FIG. 3A operates in synchronism with the local clock C2.

Figure 4A:
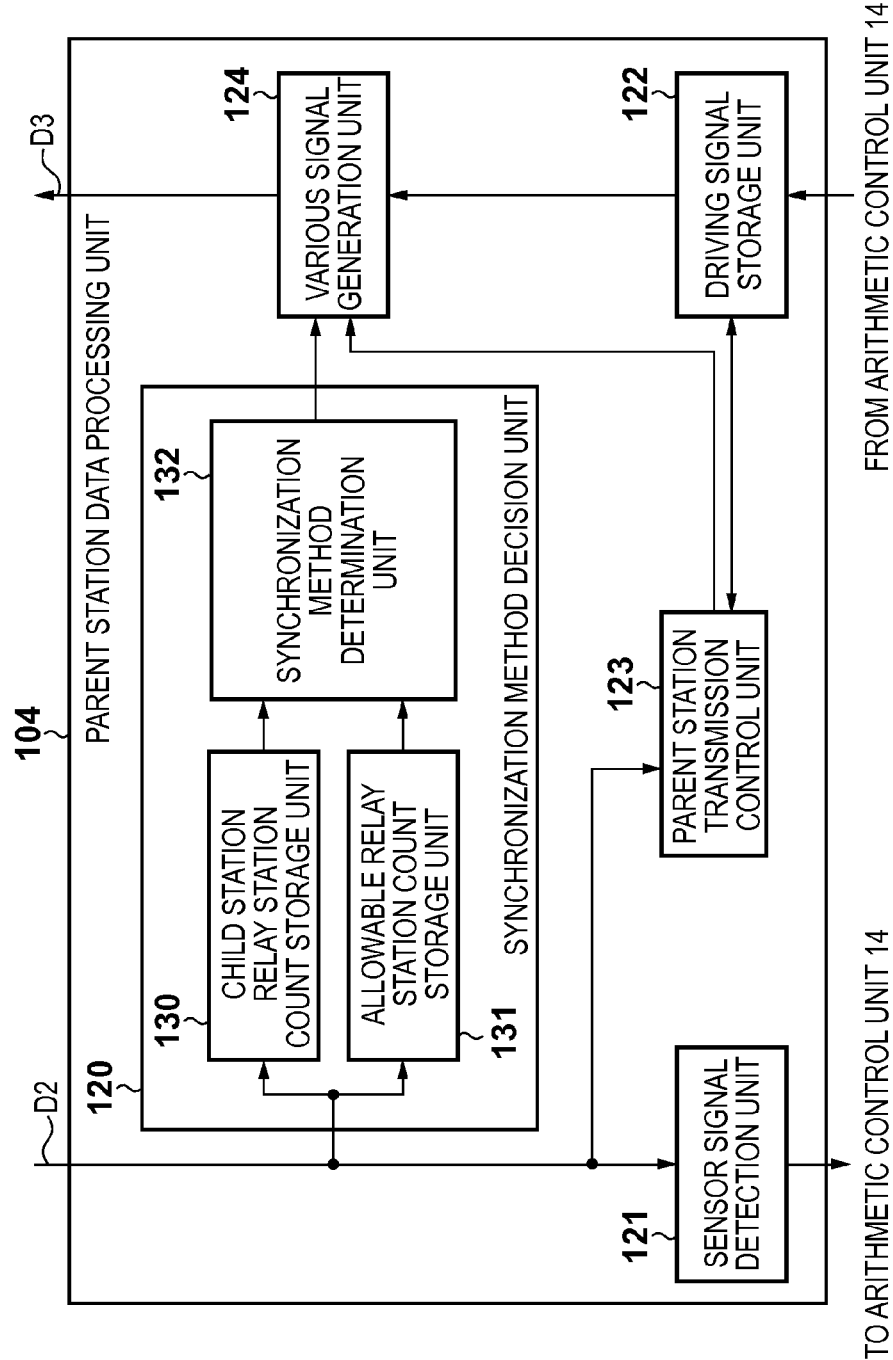
FIGS. 4A and 4B are block diagrams showing the internal arrangements of a parent station data processing unit according to the first embodiment.

The internal arrangements of the parent station data processing unit 104 will be described next with reference to FIG. 4A. The parent station data processing unit 104 includes a synchronization method decision unit 120, a sensor signal detection unit 121, a driving signal storage unit 122, a parent station transmission control unit 123, and a various signal generation unit 124.

The synchronization method decision unit 120 includes a child station relay station count storage unit 130, an allowable relay station count storage unit 131, and a synchronization method determination unit 132. The child station relay station count storage unit 130 grasps and stores the total number of child stations connected to the network. The method will be described later. The allowable relay station count storage unit 131 stores the number of relay stations (to be referred to as the "allowable number of relay stations" hereinafter) connectable in the slave synchronization method (first data relay method). In this embodiment, assume that the allowable number of relay stations is 3 and is known in advance. Hence, the allowable relay station count storage unit 131 stores a numerical value "3". The synchronization method determination unit 132 decides the synchronization method of each child station based on the information stored in the child station relay station count storage unit 130 and the allowable relay station count storage unit 131.

The sensor signal detection unit 121 detects the sensor signal output from each child station, and outputs it to the arithmetic control unit 14. The driving signal storage unit 122 temporarily stores the driving signal output from the arithmetic control unit 14. The parent station transmission control unit 123 controls the outputs of the driving signal storage unit 122 and the various signal generation unit 124 to be described later based on the data D2 in accordance with a procedure to be described later. The various signal generation unit 124 generates and outputs various signals indicated by 601 to 604 in FIG. 6. Details of the various signals will be described later.

<Arrangement of Child Station>

FIG. 3B is a block diagram showing the internal arrangement of the child station 20 according to this embodiment. The child station 20 includes the upper station connector 21, the lower station connector 22, the actuator 23, the sensor 24, the device connector 25, a child station communication unit 26, and a device control unit 27. The child station communication unit 26 includes the clock recovery unit 100, the local clock oscillation unit 101, the reception unit 102, the rate match FIFO 103, the transmission unit 105, a clock selector 106 (first selector), a reception data selector 107 (second selector), a child station data processing unit 108, and a selector control unit 109. The clock recovery unit 100, the local clock oscillation unit 101, the reception unit 102, and the transmission unit 105 perform the same operations as in the parent station 10, and a description thereof will be omitted.

The clock selector 106 selects one of the reproduced clock C1 and the local clock C2, and outputs the selected clock as a transmission clock C3 under the control of the selector control unit 109.

Although the rate match FIFO 103 has the same arrangement as that of the rate match FIFO 103 of the parent station 10, it outputs the data D2 in synchronism with not the local clock C2 but the transmission clock C3. The rate match FIFO 103 is provided to absorb the transmission rate difference generated by the frequency deviation between the reproduced clock C1 and the local clock C2, as in the parent station 10.

The reception data selector 107 selects one of the data D1 and D2, and outputs data D4 under the control of the selector control unit 109. The child station data processing unit 108 processes various kinds of data in the child station 20. Details of processing of the child station data processing unit 108 will be described later with reference to FIG. 5.

The selector control unit 109 determines the synchronization method to be employed based on data D6 and D7 from the child station data processing unit 108, and controls the clock selector 106 and the reception data selector 107, as will be described later in detail. More specifically, upon determining that the independent synchronization method (second data relay method) should be employed, the selector control unit 109 controls the clock selector 106 to select the local clock C2 as the transmission clock C3. In addition, the selector control unit 109 controls the reception data selector 107 to select the data D2 as the data D4. Conversely, upon determining that the slave synchronization method should be employed, the selector control unit 109 controls the clock selector 106 to select the reproduced clock C1 as the transmission clock C3. In addition, the selector control unit 109 controls the reception data selector 107 to select the data D1 as the data D4.

Upon receiving a driving signal from the child station data processing unit 108, the device control unit 27 controls driving of the actuator 23 based on the driving signal. Upon receiving a sensor signal acquired by the sensor 24, the device control unit 27 outputs the sensor signal to the child station data processing unit 108. Note that each block illustrated on the right side of a dotted line T10 in FIG. 3B operates in synchronism with the transmission clock C3.

Figure 5:
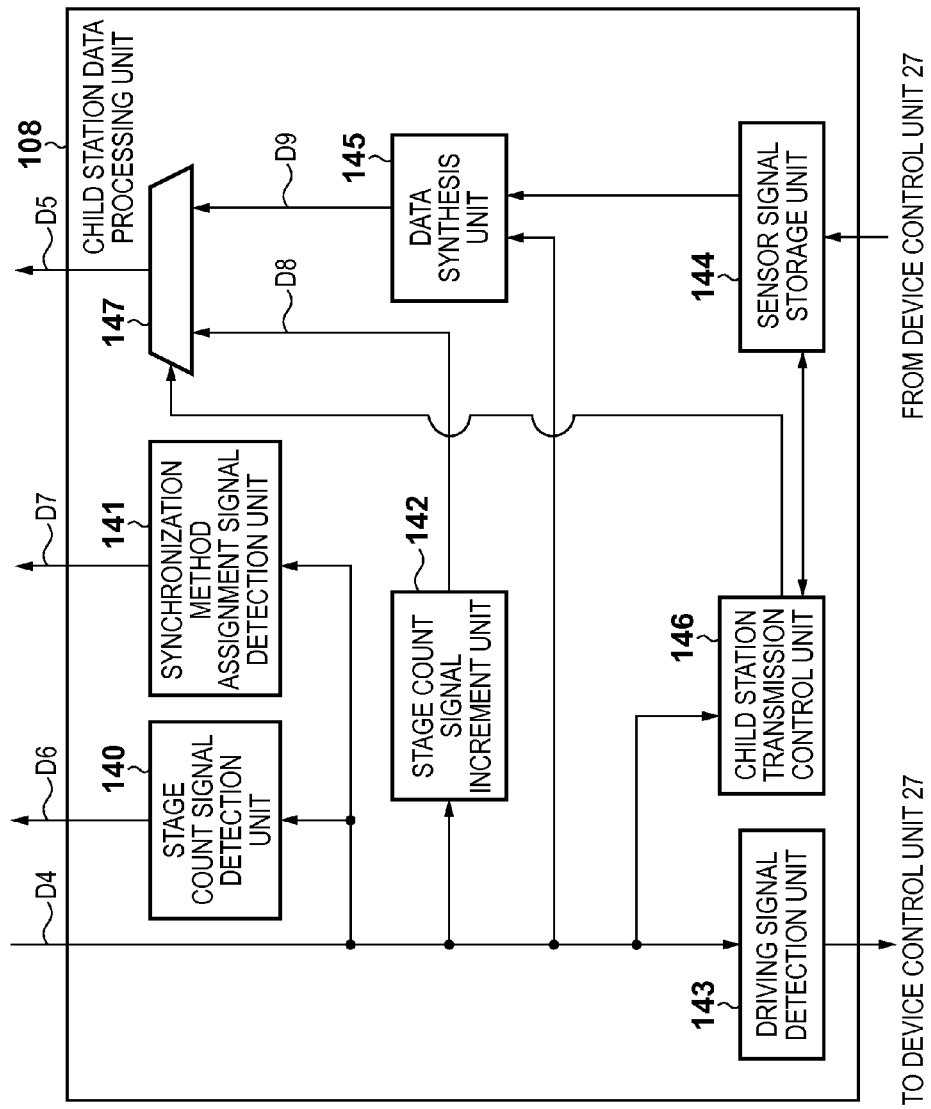
FIG. 5 is a block diagram showing the internal arrangement of a child station data processing unit according to the first embodiment.

The internal arrangement of the child station data processing unit 108 will be described next with reference to FIG. 5. The child station data processing unit 108 includes a stage count signal detection unit 140, a synchronization method assignment signal detection unit 141, a stage count signal increment unit 142, a driving signal detection unit 143, a sensor signal storage unit 144, a data synthesis unit 145, a child station transmission control unit 146, and a transmission data selector 147.

The stage count signal detection unit 140 detects a stage count signal (to be described later) output from the parent station 10, and outputs the data D6. The synchronization method assignment signal detection unit 141 detects a synchronization method assignment signal (to be described later) output from the parent station 10, and outputs the data D7. The stage count signal increment unit 142 detects the stage count signal (to be described later) output from the parent station 10, increments the numerical value by one, and outputs it as data D8. The driving signal detection unit 143 detects the driving signal output from the parent station 10, and outputs it to the device control unit 27. The sensor signal storage unit 144 temporarily stores the sensor signal output from the device control unit 27.

The data synthesis unit 145 synthesizes the sensor signal output from the sensor signal storage unit 144 with a data transmission frame (to be described later) output from the parent station 10, and outputs data D9. When the sensor signal storage unit 144 is not outputting a sensor signal, the data D4 is directly output as the data D9. Upon detecting the stage count signal, the child station transmission control unit 146 controls the transmission data selector 147 to output, as data D5, the data D8 output from the stage count signal increment unit 142. During other periods, the child station transmission control unit 146 controls the transmission data selector 147 to output, as the data D5, the data D9 output from the data synthesis unit 145. The child station transmission control unit 146 also controls the output of the sensor signal storage unit 144. The transmission data selector 147 selects one of the data D8 and D9, and outputs the selected data as the data D5 under the control of the child station transmission control unit 146.

<Transmission Control Procedure>

Figure 7:
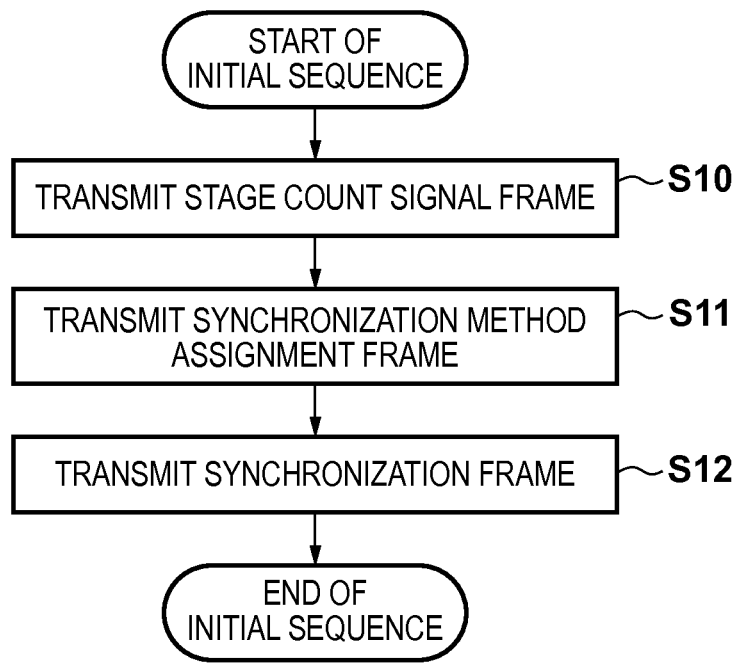
FIG. 7 is an operation flowchart of an initial sequence according to the first embodiment.

A transmission control procedure according to this embodiment will be described next. In this embodiment, an initial sequence is executed before transmission of valid data, as described above. FIG. 7 is a flowchart illustrating the initial sequence according to this embodiment. Note that the start trigger of the initial sequence is assumed to be, for example, power-on, reset, or exchange of the end effector.

The operation of step S10 in FIG. 7 will be explained first. In step S10, the parent station transmission control unit 123 of the parent station 10 controls the various signal generation unit 124 to output a stage count signal frame indicated by 601 in FIG. 6. The stage count signal frame includes a synchronization signal and a stage count signal. The synchronization signal includes a preamble and a frame synchronization signal. The preamble is a data string for clock synchronization. When the child station 20 employs the independent synchronization method, the preamble has a sufficient time length for synchronization between the transmission clock C3 of an arbitrary child station and the reproduced clock C1 of the subsequent child station. The frame synchronization signal is a specific data string for frame synchronization and time slot synchronization to be described later, and is output next to the preamble. The stage count signal is used by each child station to grasp the number of relay stations from the parent station 10 and by the parent station 10 to grasp the total number of child stations 20 connected to the network. The parent station 10 inputs a numerical value "1" to the stage count signal and outputs it.

In step S10, the selector control unit 109 of the child station 20 controls the clock selector 106 and the reception data selector 107 to employ the independent synchronization method. More specifically, the selector control unit 109 controls the clock selector 106 to select the local clock C2 as the transmission clock C3, and controls the reception data selector 107 to select the data D2 as the data D4, as described above. The reason why the independent synchronization method is employed is that all child stations can perform clock synchronization, frame synchronization, and time slot synchronization by the synchronization signal in the stage count signal frame and receive the stage count signal.

Upon detecting the stage count signal, the child station transmission control unit 146 of the child station data processing unit 108 controls the transmission data selector 147 to output, as the data D5, the data D8 output from the stage count signal increment unit 142. The stage count signal increment unit 142 detects the stage count signal output from the parent station 10, increments the numerical value by one, and outputs it as the data D8. For example, in the child station 20A, since the numerical value "1" has already been input to the stage count signal, the numerical value is incremented to "2" and output. Similarly, in the child station 20B, since the numerical value "2" has already been input to the stage count signal, the numerical value is incremented to "3" and output. FIG. 8A shows a state in which the stage count signal frame is relayed. The stage count signal is incremented by one every time it moves to the adjacent child station.

Upon detecting the stage count signal output from the parent station 10, the stage count signal detection unit 140 of the child station data processing unit 108 outputs the numerical value of the stage count signal as the data D6. For example, the child station 20A outputs the numerical value "1", and the child station 20B outputs the numerical value "2" as the data D6. Upon receiving the data D6, the selector control unit 109 stores the numerical value as the value of the number of relay stations. With the above-described operation, the selector control unit 109 of each child station stores the number of relay stations from the parent station 10.

Upon detecting the stage count signal that has passed through all the child stations and returned, the child station relay station count storage unit 130 of the parent station data processing unit 104 of the parent station 10 decrements the numerical value of the stage count signal by one and stores it. At this time, "the total number of child stations 20 connected to the network+1" has been input to the stage count signal by the above-described series of relay operations. In this embodiment, since the total number of child stations 20 connected to the network is N, N+1 has been input to the stage count signal. Hence, the child station relay station count storage unit 130 stores the numerical value N.

The synchronization method determination unit 132 grasps the total number of child stations 20 from the numerical value information stored in the child station relay station count storage unit 130 and the allowable relay station count storage unit 131, and decides the synchronization method of each child station. In this embodiment, the allowable number of relay stations is 3. For this reason, the synchronization method determination unit 132 decides that the child stations 20C, 20F, . . . that are relay stations corresponding to integer multiples of 3 should employ the independent synchronization method, and the remaining child stations (child stations 20A, 20B, 20D, 20E, 20G, . . . ) should employ the slave synchronization method. When the parent station transmission control unit 123 detects the stage count signal that has passed through all the child stations and returned, the process advances to step S11.

The operation of step S11 will be explained next. In step S11, the parent station transmission control unit 123 of the parent station 10 controls the various signal generation unit 124 to output a synchronization method assignment frame indicated by 602 in FIG. 6. The synchronization method assignment frame includes a synchronization signal and a synchronization method assignment signal. The synchronization method assignment signal is generated based on the decision of the synchronization method decision unit 120 in step S10. In this embodiment, table information shown in FIG. 9 is output as the synchronization method assignment signal. In step S11, the child station transmission control unit 146 of the child station data processing unit 108 of the child station 20 controls the transmission data selector 147 to output, as the data D5, the data D9 output from the data synthesis unit 145. The arithmetic control unit 145 also relays the synchronization method assignment frame output from the parent station 10. With the above-described operation, the synchronization method assignment frame is relayed to each child station.

Upon detecting the synchronization method assignment signal output from the parent station 10, the synchronization method assignment signal detection unit 141 of the child station data processing unit 108 outputs the synchronization method assignment signal as the data D7. Upon receiving the data D7, the selector control unit 109 stores the table information input to the synchronization method assignment signal. In this embodiment, the table information shown in FIG. 9 is stored. The selector control unit 109 determines the synchronization method to be employed by the local station based on the table information and the value of the number of relay stations stored in step S10. For example, the child station 20A determines to employ the slave synchronization method because the value of the number of relay stations is 1. The child station 20C determines to employ the independent synchronization method because the value of the number of relay stations is 3.

The selector control unit 109 controls the clock selector 106 and the reception data selector 107 based on the determination result. That is, the selector control unit 109 of each of the child stations 20C, 20F, . . . , which has determined to employ the independent synchronization method, controls the clock selector 106 and the reception data selector 107 to maintain the current independent synchronization method. On the other hand, the selector control unit 109 of each of the child stations 20A, 20B, 20D, 20E, 20G . . . , which has determined to employ the slave synchronization method, controls the clock selector 106 and the reception data selector 107 to switch from the independent synchronization method to the slave synchronization method. More specifically, the clock selector 106 is controlled to select not the local clock C2 but the reproduced clock C1 as the transmission clock C3, as described above. In addition, the reception data selector 107 is controlled to select not the data D2 but the data D1 as the data D4. Note that to prevent any data error, the synchronization method switching is assumed to be done after the synchronization method assignment frame has been transmitted to the subsequent child station. With the above-described operation, the synchronization method of each child station is changed in step S11, as shown in FIG. 8B. When the parent station transmission control unit 123 detects the synchronization method assignment signal that has passed through all the child stations and returned, the process advances to step S12.

The operation of step S12 will be explained next. In step S12, the parent station transmission control unit 123 of the parent station 10 controls the various signal generation unit 124 to output a synchronization frame indicated by 603 in FIG. 6. The synchronization frame is a data string for clock synchronization, and has a sufficient time length for synchronization between the transmission clock C3 of a child station that has employed the independent synchronization method in step S11 and the reproduced clock C1 of the child station that is located in the subsequent stage of the child station and has employed the first independent synchronization method. That is, when the transmission of the synchronization frame is completed, the transmission clock C3 of each child station that has employed the independent synchronization method, the reproduced clock C1 of the child station that is located in the subsequent stage of the child station and has employed the first independent synchronization method, and the transmission clock C3 of each child station that is located between them and has employed the slave synchronization method synchronize with each other. When the parent station transmission control unit 123 completes output of the synchronization frame, the initial sequence ends, and the process advances to a data transmission phase.

The operation in the data transmission phase will be described next. In the data transmission phase, the parent station transmission control unit 123 of the parent station 10 controls the various signal generation unit 124 to continuously output a data transmission frame indicated by 604 in FIG. 6. If a driving signal to be output is stored in the driving signal storage unit 122, the parent station transmission control unit 123 controls the driving signal storage unit 122 to output the driving signal.

The data transmission frame includes a synchronization signal, a valid data transmission period, and an idle period. The valid data transmission period is formed from an arbitrary number of time slots. Control signals such as a driving signal, a sensor signal, and an error notification are transmitted by the time slots. In this embodiment, a description will be made assuming that the valid data transmission period is formed from 16 time slots. Each time slot includes a flag portion and a data portion. A flag representing whether valid data exists in the data portion of the time slot is input to the flag portion. The flag of a time slot with valid data will be referred to as a valid flag, and the flag of a time slot (to be referred to as an "empty time slot" hereinafter) without valid data will be referred to as an empty flag hereinafter. The various signal generation unit 124 inserts the driving signal output from the driving signal storage unit 122 into an arbitrary time slot and outputs it.

The idle period is provided as a period to correct and maintain the synchronization between the parent station and a child station. In the idle period, the rate match FIFO 103 of the parent station 10 and the rate match FIFO 103 of each child station 20 that has employed the independent synchronization method perform correction not to cause overflow or underflow. The idle period is a period during which no valid data is transmitted and can originally be a no-signal period. In this embodiment, however, a specific bit pattern (for example, 101010 . . . ) is inserted to maintain clock synchronization. In the data transmission phase, the driving signal detection unit 143 of the child station data processing unit 108 of the child station 20 detects the driving signal for the local station output from the parent station 10, and outputs the driving signal to the device control unit 27. The child station transmission control unit 146 controls the transmission data selector 147 to output, as the data D5, the data D9 output from the data synthesis unit 145. If a sensor signal to be output is stored in the sensor signal storage unit 144, the child station transmission control unit 146 controls the sensor signal storage unit 144 to detect an empty flag and output the sensor signal.

Upon receiving the sensor signal from the sensor signal storage unit 144, the data synthesis unit 145 inputs the sensor signal to the data portion of the time slot, and outputs it as the data D9. In addition, the flag portion is rewritten from the empty flag to the valid flag to prevent the subsequent child station from overwriting. In other periods (periods during which no sensor signal is input from the sensor signal storage unit 144), the data D4 is directly output as the data D9. With the above-described operation, the parent station 10 and the child stations transmit control signals such as a driving signal and a sensor signal.

When the above-described arrangement is used, a child station that employs the independent synchronization method is inserted before the number of relay stations exceeds the allowable number of relay stations connectable in the slave synchronization method, as shown in FIG. 8B. This enables to reset the jitter amount added every time data passes through the child station that has employed the slave synchronization method before it exceeds an allowable value. Hence, cables other than those for data transmission are unnecessary, and a number of child stations can be connected to the network. In addition, the data relay time can be shortened as compared to a case in which all child stations employ the independent synchronization method.

In this embodiment, it is possible to grasp the number of relay stations of each child station connected to the network and adaptively switch the synchronization method in accordance with the number of relay stations, as described above. For this reason, the embodiment is suitable for a control system that dynamically switches the network configuration, like, for example, a robot system that exchanges the end effector.

Figure 4B:
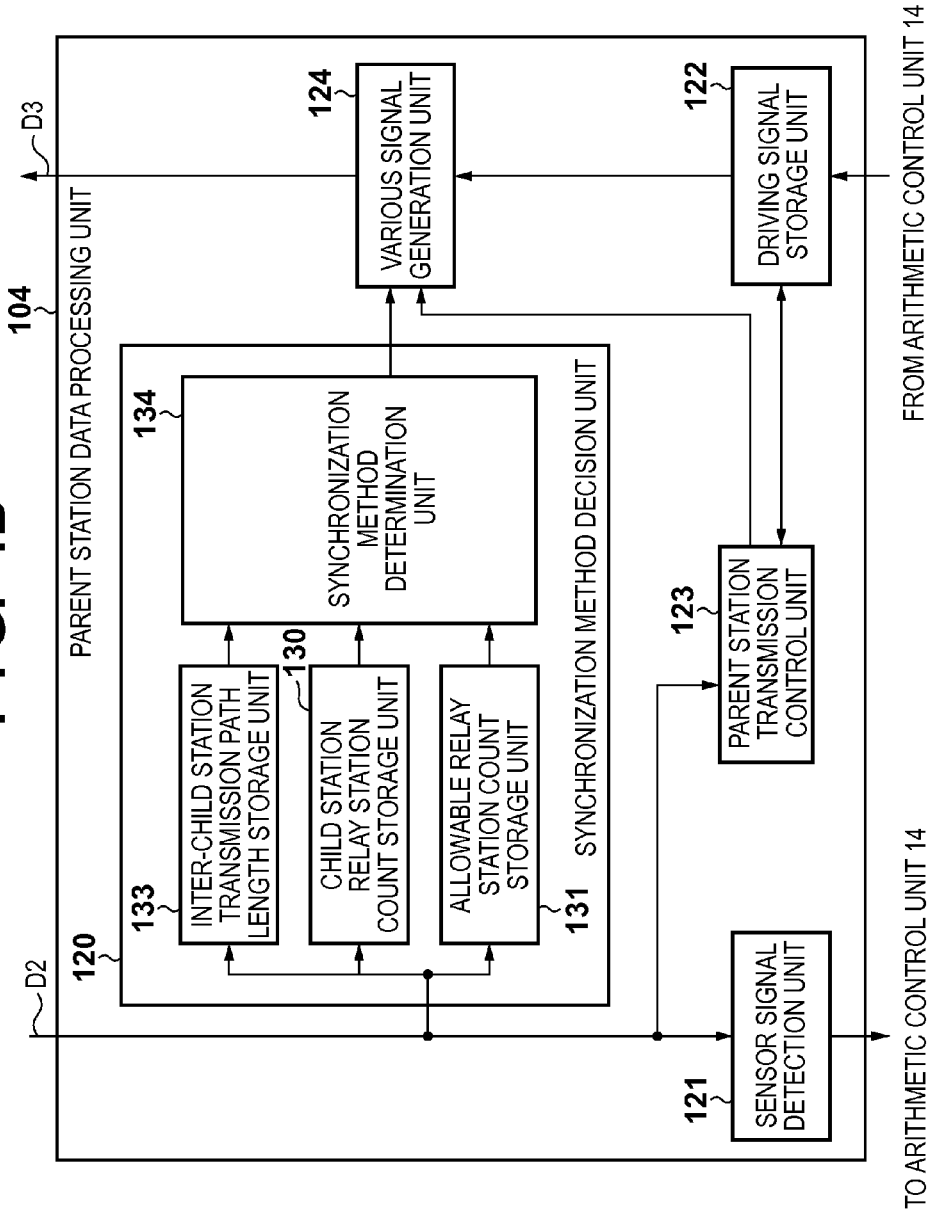

In this embodiment, an arrangement has been described, which decides the synchronization method of each child station based on only the number of relay stations from the parent station. However, the present invention is not limited to this. As shown in FIG. 4B, an inter-child station transmission path length storage unit 133 that stores the transmission path length between the child stations may newly be provided in the synchronization method decision unit 120, and the information may be reflected on the synchronization method decision by, for example, decreasing the allowable number of relay stations in a section where the transmission path has a predetermined length or more. To grasp the transmission path length between the child stations, for example, a method of measuring the transmission delay between the child stations and estimating the transmission path length from the measurement result may be employed. If the transmission path length is defined in advance, a method of storing the information in a ROM and reading out it as needed may be employed. In this embodiment, an arrangement has been described, which causes the parent station to decide the synchronization method of each child station. However, the present invention is not limited to this. Each child station may autonomously decide the synchronization method to be employed by the local station. For example, each child station may include the allowable relay station count storage unit and grasp the number of relay stations from the parent station using the method described in the embodiment or the like, thereby deciding the synchronization method of the local station.

In this embodiment, an arrangement has been described, which provides a flag portion in time slot and causes a child station to detect an empty time slot to output a sensor signal. However, the present invention is not limited to this. A time slot for transmission/reception may be assigned to each child station in advance.

In this embodiment, the description has been made assuming that the allowable number of relay stations stored in the allowable relay station count storage unit is unique. However, the present invention is not limited to this. The numerical value of the allowable number of relay stations may be changed in accordance with, for example, the type of the connected end effector or the control contents. If data errors more than an allowable value have occurred in the data transmission phase, the allowable number of relay stations may be decremented by one, and the processing may be resumed from the initial sequence again. This will be explained using, for example, the embodiment. When the parent station transmission control unit 123 detects occurrence of data errors more than the allowable value in the data transmission phase, control may be done to change the allowable number of relay stations stored in the allowable relay station count storage unit 131 from 3 to 2 and perform the processing from the initial sequence again.

According to this embodiment, cables other than those for data transmission are unnecessary, and a number of child stations can be connected to the network. In addition, the data relay time can be shortened as compared to a case in which all terminal stations employ the independent synchronization method. Hence, the communication system and the communication method according to the present invention are suitable for a control system that includes a number of devices and requires high-speed feedback control.

Second Embodiment

In the first embodiment, an arrangement has been described, which causes the parent station 10 to grasp the number of relay stations of each child station and decide the synchronization method of each child station in the initial sequence. In addition, a method has been described, which, if data errors more than an allowable value have occurred in the data transmission phase, decrements the allowable number of relay stations by one and resumes the processing from the initial sequence again. In this method, however, the allowable number of relay stations of a portion that is not directly relevant to a child station that causes a data error may also decrease.

In this embodiment, a child station that causes a data error is estimated, and only the child station is switched from the slave synchronization method to the independent synchronization method.

Figure 11B:
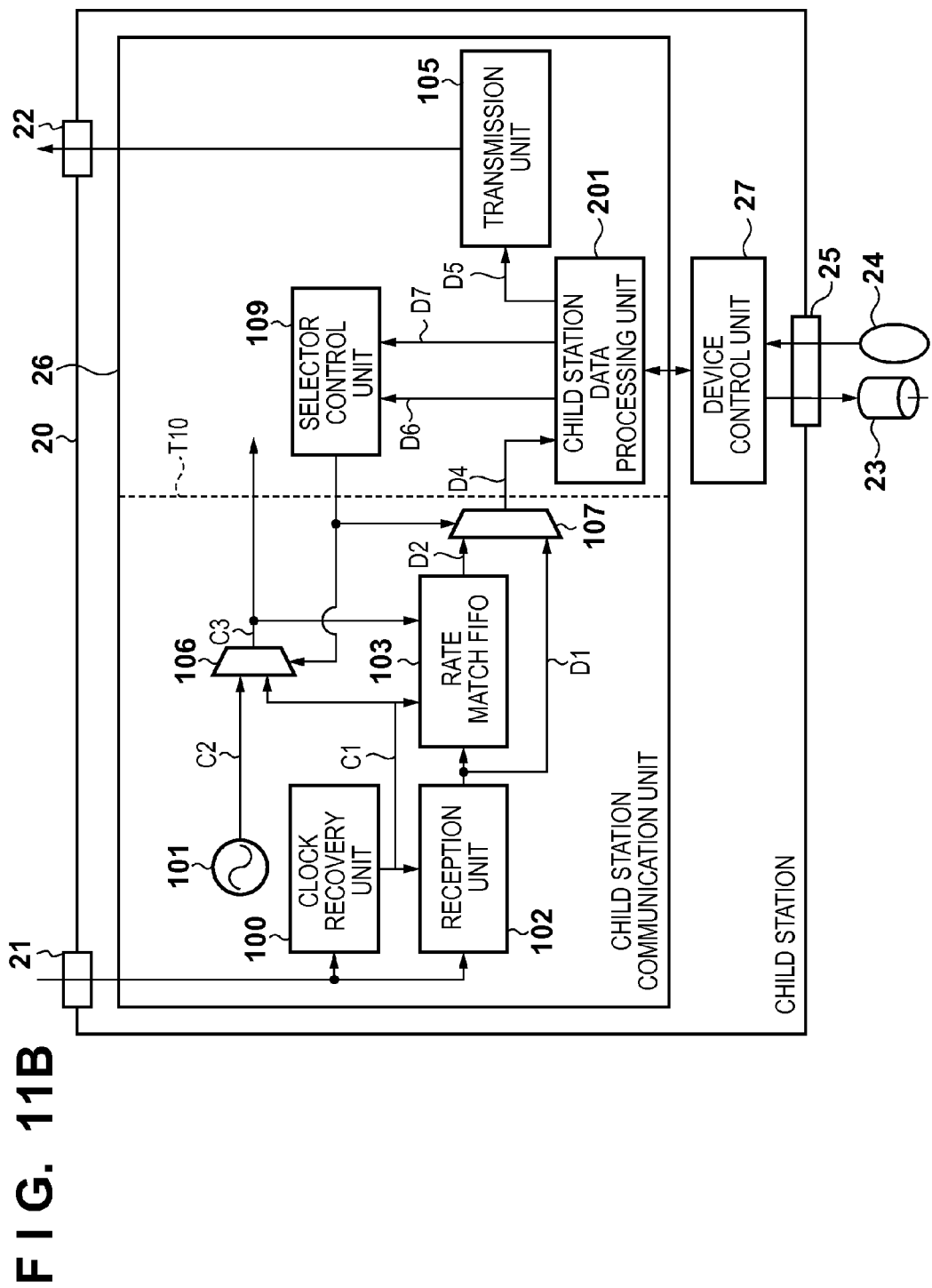

FIGS. 10A and 10B are views of a network configuration according to this embodiment. In this embodiment, assume that the transmission path between child stations 20E and 20F is longer than the other transmission paths, as shown in FIG. 10A, a jitter more than the allowable value occurs in a reproduced clock C1 of the child station 20F, and the error rate exceeds an allowable value. In this embodiment, since data is relayed, the data error that has occurred in the child station 20F propagates to the subsequent child stations. For this reason, the error rate exceeds the allowable value even in the child stations after the child station 20F. FIGS. 11A and 11B show the internal arrangements of a parent station 10 and a child station 20 according to this embodiment, respectively.

<Arrangement of Parent Station>

FIG. 11A is a block diagram showing the internal arrangement of the parent station 10 according to this embodiment. Note that the same reference numerals as in the first embodiment denote blocks that perform the same operations, and a description thereof will be omitted. Processing of a parent station data processing unit 200 is different from the first embodiment.

Figure 12A:
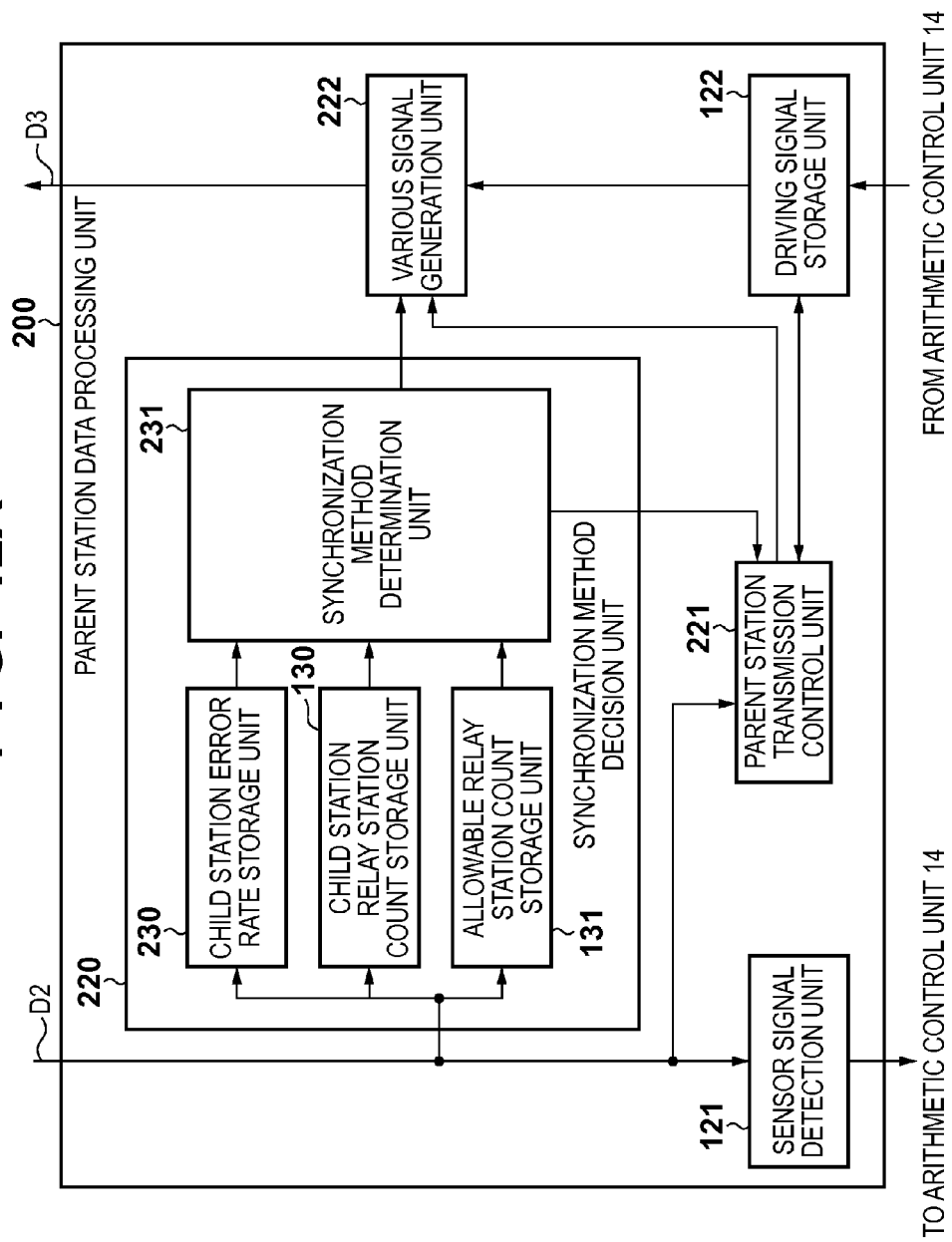
FIGS. 12A and 12B are block diagrams showing the internal arrangements of a parent station data processing unit according to the second embodiment.

FIG. 12A is a block diagram showing the internal arrangements of the parent station data processing 200. The parent station data processing unit 200 includes a sensor signal detection unit 121, a driving signal storage unit 122, a synchronization method decision unit 220, a parent station transmission control unit 221, and a various signal generation unit 222. The sensor signal detection unit 121 and the driving signal storage unit 122 perform the same operations as in the first embodiment, and a description thereof will be omitted.

The synchronization method decision unit 220 includes a child station relay station count storage unit 130, an allowable relay station count storage unit 131, a child station error rate storage unit 230, and a synchronization method determination unit 231. The child station relay station count storage unit 130 and the allowable relay station count storage unit 131 perform the same operations as in the first embodiment, and a description thereof will be omitted. The child station error rate storage unit 230 detects and stores an error rate measurement signal output from the child station 20 to be described later. The synchronization method determination unit 231 determines and decides the synchronization method of each child station based on the information stored in the child station relay station count storage unit 130, the child station error rate storage unit 230, and the allowable relay station count storage unit 131. The synchronization method determination unit 231 also outputs an operation instruction to the parent station transmission control unit 221 in accordance with the error rate of the child station, as will be described later in detail.

The parent station transmission control unit 221 controls the outputs of the driving signal storage unit 122 and the various signal generation unit 222 to be described later based on data D2 and the operation instruction from the synchronization method determination unit 231 in accordance with a procedure to be described later.

Figure 6:
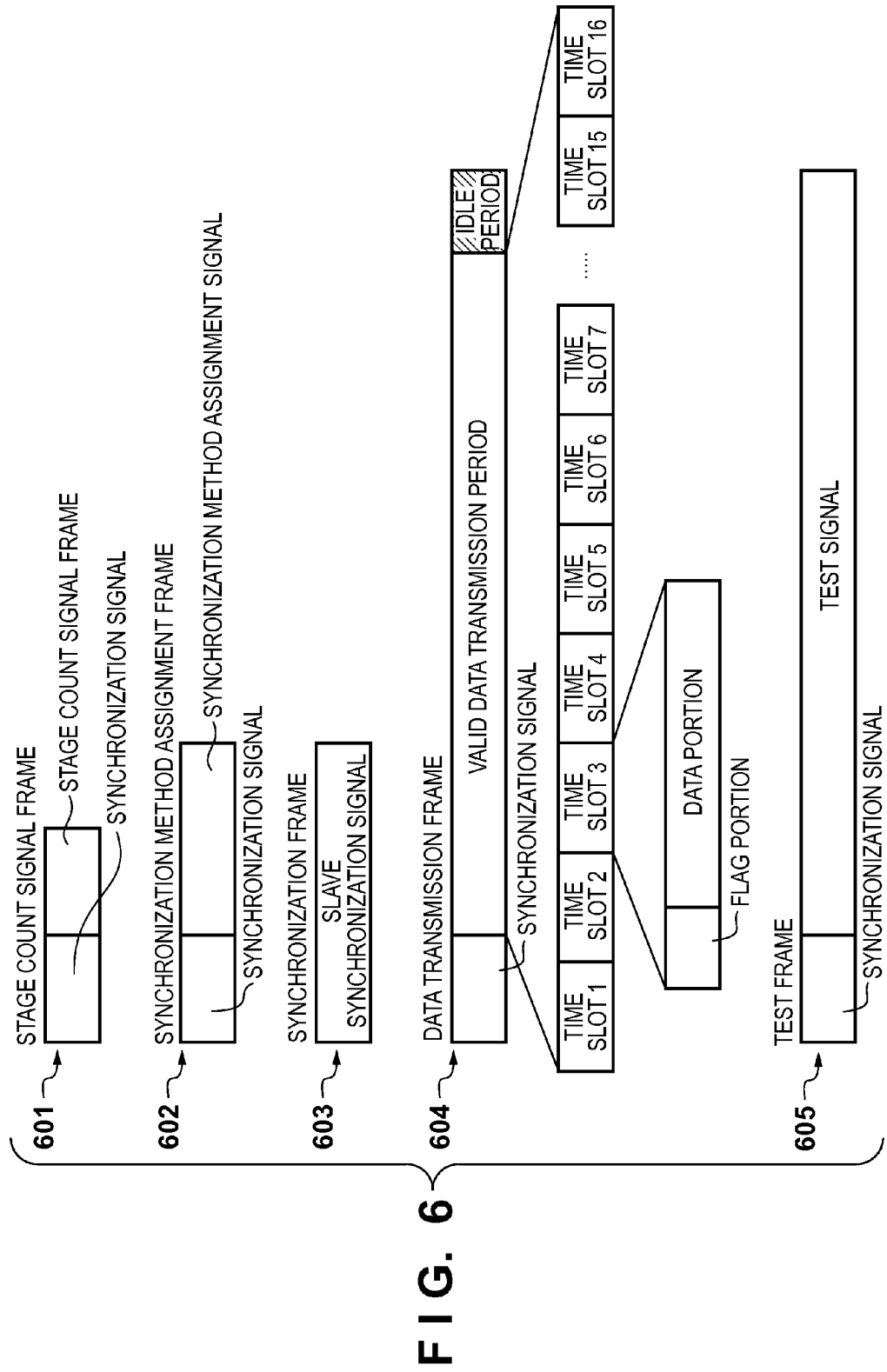
FIG. 6 is a view for explaining signals generated by a various signal generation unit according to the first to third embodiments.

The various signal generation unit 222 generates and outputs various signals indicated by 601 to 605 in FIG. 6. The signals 601 to 604 in FIG. 6 are the same as in the first embodiment. The contents of the signal 605 in FIG. 6 will be described later.

<Arrangement of Child Station>

FIG. 11B is a block diagram showing the internal arrangement of the child station 20 according to this embodiment. Note that the same reference numerals as in the first embodiment denote blocks that perform the same operations, and a description thereof will be omitted. Processing of a child station data processing unit 201 is different from the first embodiment.

Figure 13:
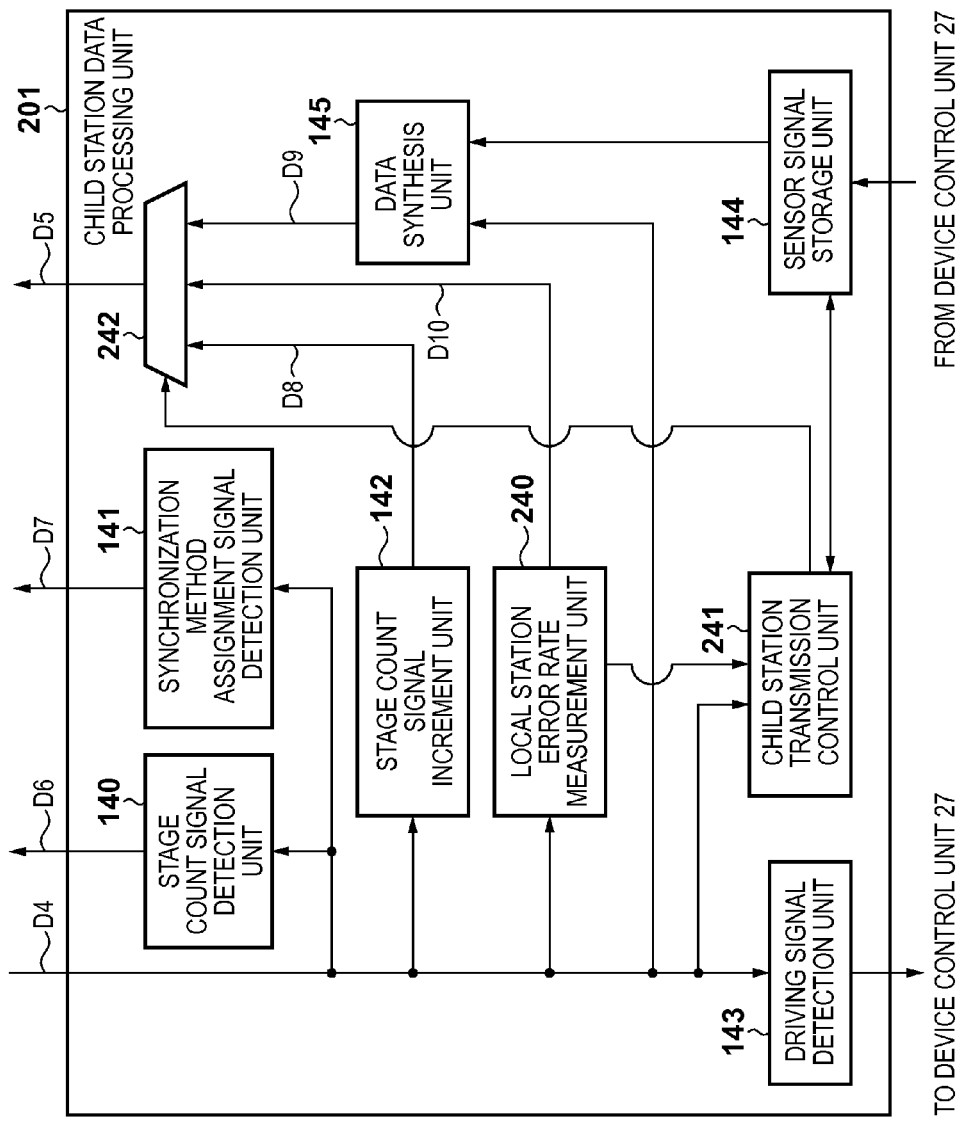
FIG. 13 is a block diagram showing the internal arrangement of a child station data processing unit according to the second embodiment.

FIG. 13 is a block diagram showing the child station data processing unit 201. The child station data processing unit 201 includes a stage count signal detection unit 140, a synchronization method assignment signal detection unit 141, a stage count signal increment unit 142, a driving signal detection unit 143, a sensor signal storage unit 144, a data synthesis unit 145, a child station transmission control unit 241, a transmission data selector 242, and a local station error rate measurement unit 240. The stage count signal detection unit 140, the synchronization method assignment signal detection unit 141, the stage count signal increment unit 142, the driving signal detection unit 143, the sensor signal storage unit 144, and the data synthesis unit 145 perform the same operations as in the first embodiment, and a description thereof will be omitted.

The local station error rate measurement unit 240 measures the error rate of the local station using a test signal output from the parent station 10 to be described later. When the measurement has ended, the local station error rate measurement unit 240 issues an output instruction to the child station transmission control unit 241, and outputs the error rate measurement signal as data D10.

In addition to the operation of the first embodiment, upon detecting the output instruction from the local station error rate measurement unit 240, the child station transmission control unit 241 controls the transmission data selector 242 to output, as data D5, the data D10 output from the local station error rate measurement unit 240. The transmission data selector 242 selects one of data D8, D9, and D10, and outputs the selected data as the data D5 under the control of the child station transmission control unit 241.

<Transmission Control Procedure>

Figure 14:
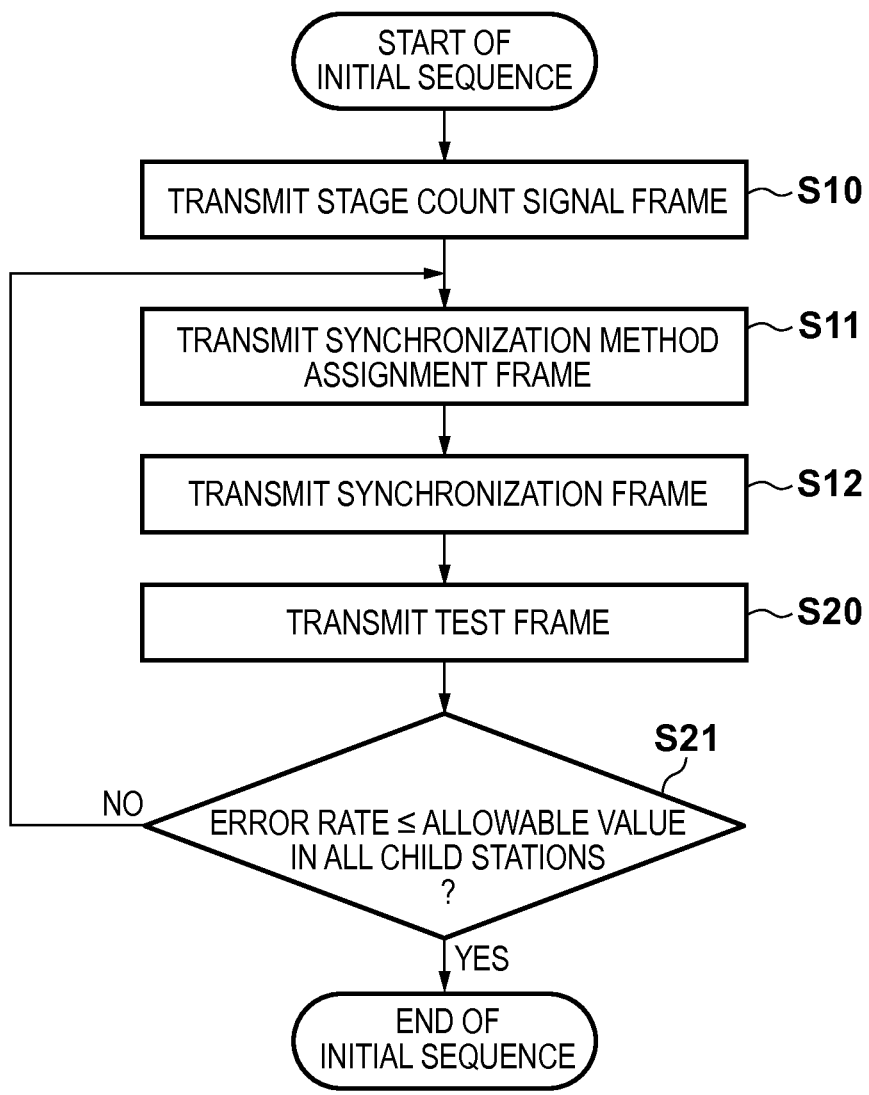
FIG. 14 is an operation flowchart of an initial sequence according to the second embodiment.

A data transmission control procedure according to this embodiment will be described next. In this embodiment, an initial sequence is executed before transmission of valid data, as in the first embodiment. FIG. 14 is a flowchart illustrating the initial sequence according to this embodiment. The same operations as in the first embodiment are performed in the processes of steps S10 to S12, and a description thereof will be omitted.

The operation of step S20 will be explained. In step S20, the parent station transmission control unit 221 of the parent station 10 controls the various signal generation unit 222 to output a test frame indicated by 605 in FIG. 6. The test frame includes a synchronization signal and a test signal. For example, a pseudo random pattern is input to the test signal.

In step S20, the child station transmission control unit 241 of the child station data processing unit 201 of the child station 20 controls the transmission data selector 147 to output, as the data D5, the data D9 output from the data synthesis unit 145. The arithmetic control unit 145 also relays the test frame output from the parent station 10. With the above-described operation, the test frame is relayed to each child station 20.

Upon detecting the test signal output from the parent station 10, the local station error rate measurement unit 240 of the child station data processing unit 201 measures the error rate in the local station using the test signal. As the measurement method, for example, a method of comparing the received test signal with a test signal that should originally be received to calculate the error rate may be used. Alternatively, a method of performing error-detection coding for the data and counting a data error may be used. When all test signals are received, and the error rate measurement is completed, the local station error rate measurement unit 240 issues an output instruction to the child station transmission control unit 241, and outputs the error rate measurement signal as the data D10.

Upon detecting the output instruction from the local station error rate measurement unit 240, the child station transmission control unit 241 controls the transmission data selector 242 to output, as the data D5, the data D10 output from the local station error rate measurement unit 240. With the above-described operation, the error rate measurement signal measured in each child station is transmitted to the parent station 10. The child station error rate storage unit 230 of the parent station data processing unit 200 of the parent station 10 detects and stores the error rate measurement signal from each child station. After that, the process advances to step S21.

The operation of step S21 will be explained next. In step S21, the synchronization method determination unit 231 of the parent station 10 reads out the error rate of each child station from the child station error rate storage unit 230. The synchronization method determination unit 231 then determines whether the error rate is equal to or less than the allowable value in all child stations. Upon determining that the error rate is equal to or less than the allowable value in all child stations (YES in step S21), the synchronization method determination unit 231 outputs an operation instruction to the parent station transmission control unit 221 to complete the initial sequence and advance to the data transmission phase.

However, if at least one child station whose error rate exceeds the allowable value exists, the child station that causes the data error is estimated. Any method is usable as the estimation method. In this embodiment, the estimation is performed by detecting a child station from which the error rate has risen. In this embodiment, as described above, the error rate exceeds the allowable value from the child station 20F to the child station 20N, as shown in FIG. 10A. For this reason, the synchronization method determination unit 231 determines that a jitter more than the allowable value has occurred in the reproduced clock C1 of the child station 20F, and decides to change the synchronization method of the child station 20E in the preceding stage of the child station 20F from the slave synchronization method to the independent synchronization method. The synchronization method determination unit 231 also outputs an operation instruction to the parent station transmission control unit 221 to start the processing from step S11 again. That is, upon determining that at least one child station whose error rate exceeds the allowable value exists (NO in step S21), the above-described processing is performed, and the process then returns to step S11.

Upon receiving the instruction, the parent station transmission control unit 221 starts the processing from step S11 again. That is, the parent station transmission control unit 221 controls the various signal generation unit 222 to output a synchronization method assignment frame indicated by 602 in FIG. 6. At this time, table information shown in FIG. 15 is output as the synchronization method assignment signal. With the above-described operation, the synchronization method of each child station is changed, as shown in FIG. 10B.

After that, if the error rate is equal to or less than the allowable value in all child stations in step S21, the initial sequence ends, and the process advances to a data transmission phase. If a child station whose error rate exceeds the allowable value exists, the child station that causes the data error is estimated again. The process returns to step S11 to perform processing to change the synchronization method of the child station.

Figure 12B:
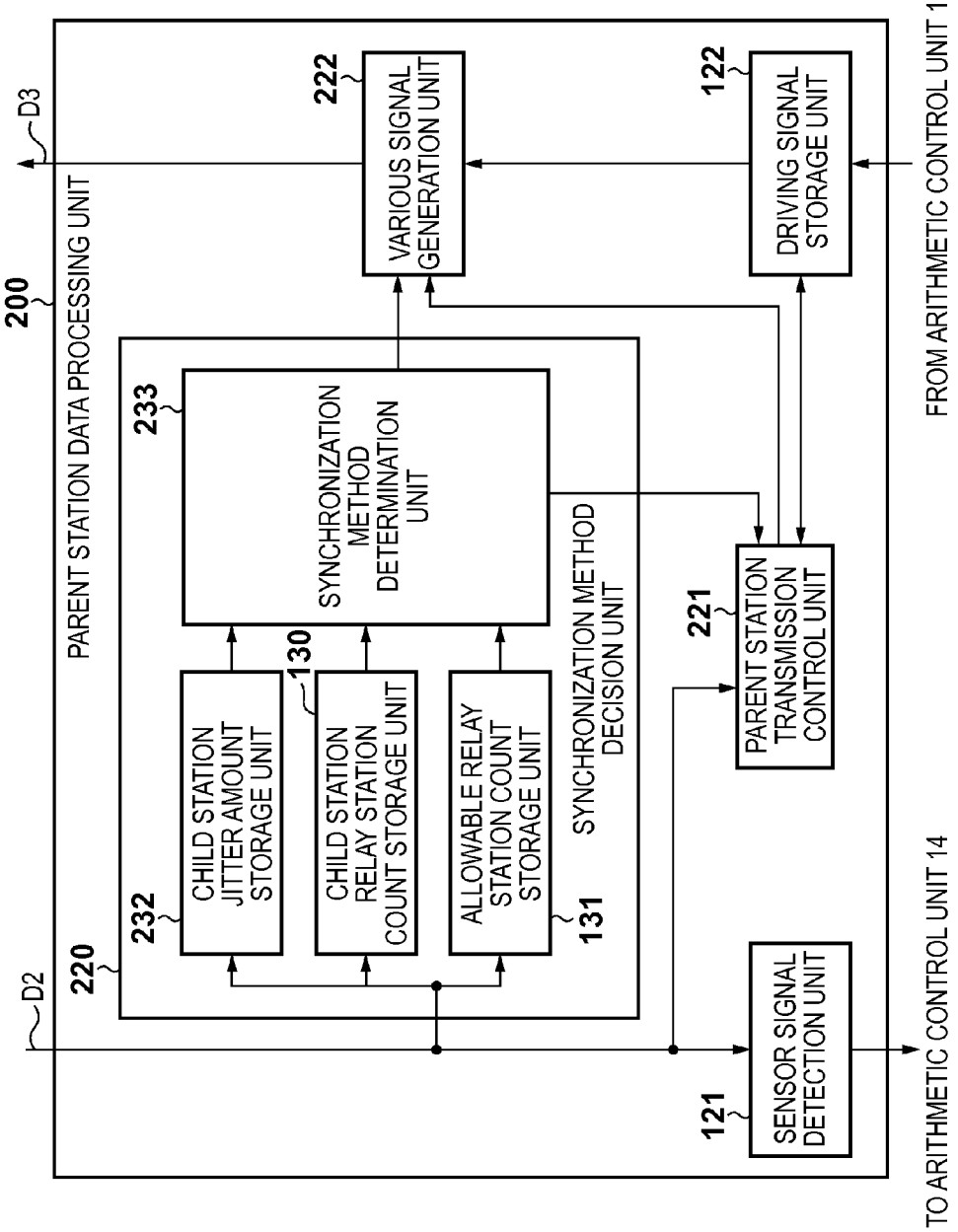

Note that in this embodiment, an arrangement has been described, which causes the parent station to collect information about the data error of each child station and estimate the child station that causes the data error. However, the present invention is not limited to this. Each child station may collect information about the jitter amount in itself and estimate the child station that causes the data error. For example, each child station is newly provided with an arrangement for measuring the jitter amount in the reproduced clock of the local station, and outputs the measured jitter amount to the parent station. The synchronization method decision unit 220 of the parent station includes a child station jitter amount storage unit 232 that stores a child station jitter amount in place of the child station error rate storage unit 230, as shown in FIG. 12B. The child station jitter amount storage unit 232 stores the measured jitter amount output from each child station. A synchronization method determination unit 233 searches for based on the information stored in the child station jitter amount storage unit 232 whether a child station that generates a jitter amount more than the allowable value exists. If a child station that generates a jitter amount more than the allowable value exists, the synchronization method determination unit 233 decides to change the synchronization method of the child station in the preceding stage of the child station of interest from the slave synchronization method to the independent synchronization method. As described above, an arrangement for switching the synchronization method in accordance with the jitter amount in each child station may be used.

As described above, according to this embodiment, it is possible to change only a child station that causes a data error from the slave synchronization method to the independent synchronization method. Hence, the data relay time in the entire system can be minimized.

Third Embodiment

In the first and second embodiments, an arrangement has been described, which causes the parent station 10 to grasp the number of relay stations of each child station and decide the synchronization method of each child station in the initial sequence. However, there is a control system that is more useful if the synchronization method switching can be done not only in the initial sequence but also during the data transmission phase. An example is a control system that switches a sensor or an actuator to be used for control adaptively in accordance with operation contents or ambient environment.

Figure 16C:
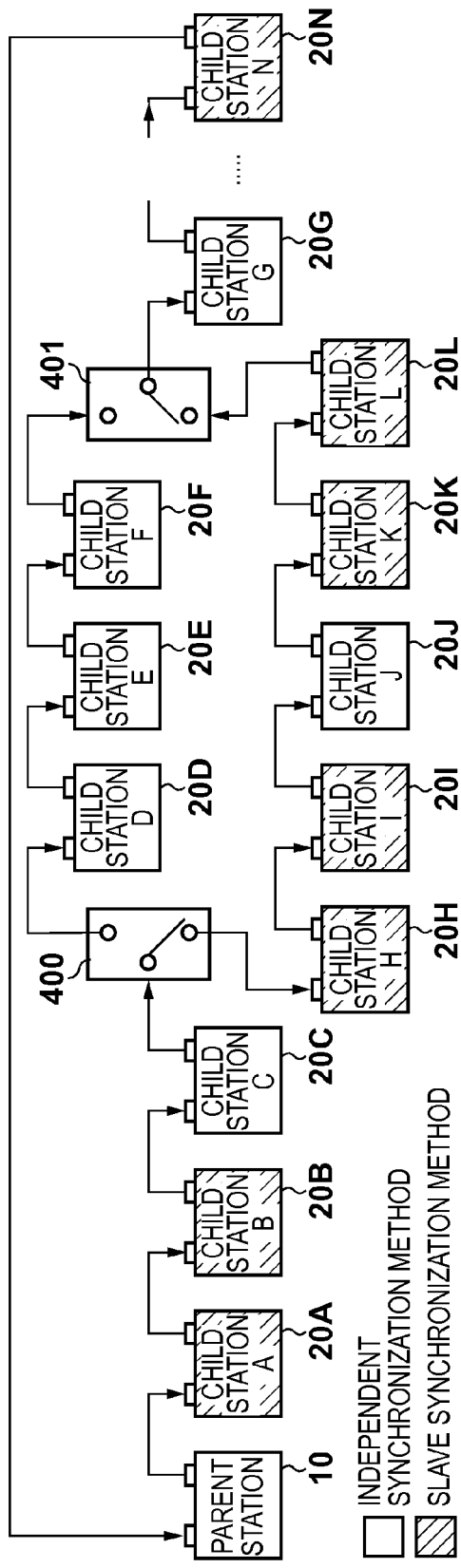

FIGS. 16A to 16C are views of a network configuration according to this embodiment.

This network includes topology selectors 400 and 401 as shown in FIGS. 16A to 16C. The topology selectors 400 and 401 operate to select the topology shown in FIG. 16A when the control system including the network performs a predetermined operation and to select the topology shown in FIG. 16B when performing another operation. In this embodiment, assume that parent station 10 and the topology selectors 400 and 401 are connected by control lines (not shown), and the parent station 10 controls the topology selectors 400 and 401.

In the above-described control system that switches the network topology adaptively in accordance with operation contents or ambient environment, the operation efficiency lowers if the initial sequence is performed at each time of topology switching.

Figure 17A:
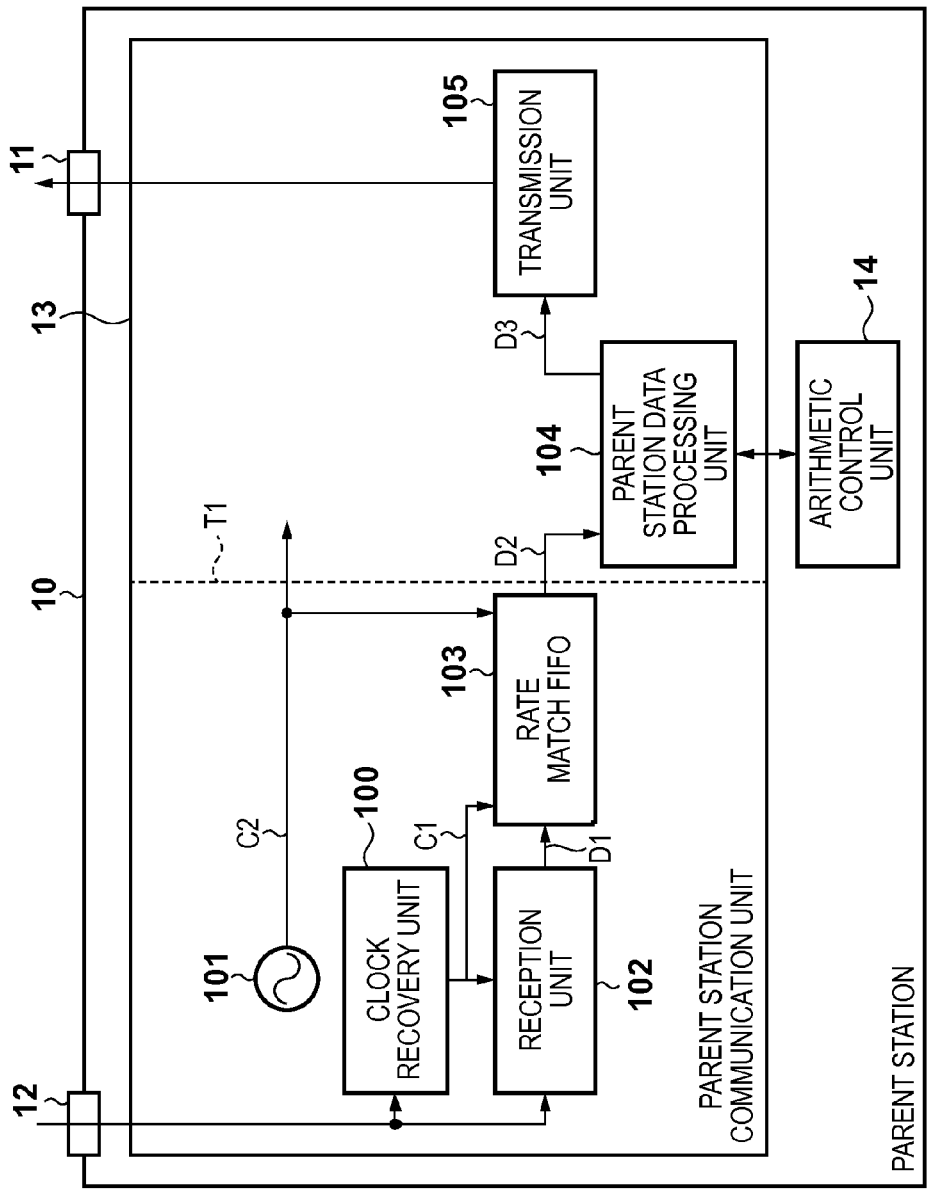
FIGS. 17A and 17B are block diagrams showing the internal arrangements of a parent station and a child station according to the third embodiment, respectively.
Figure 17B:
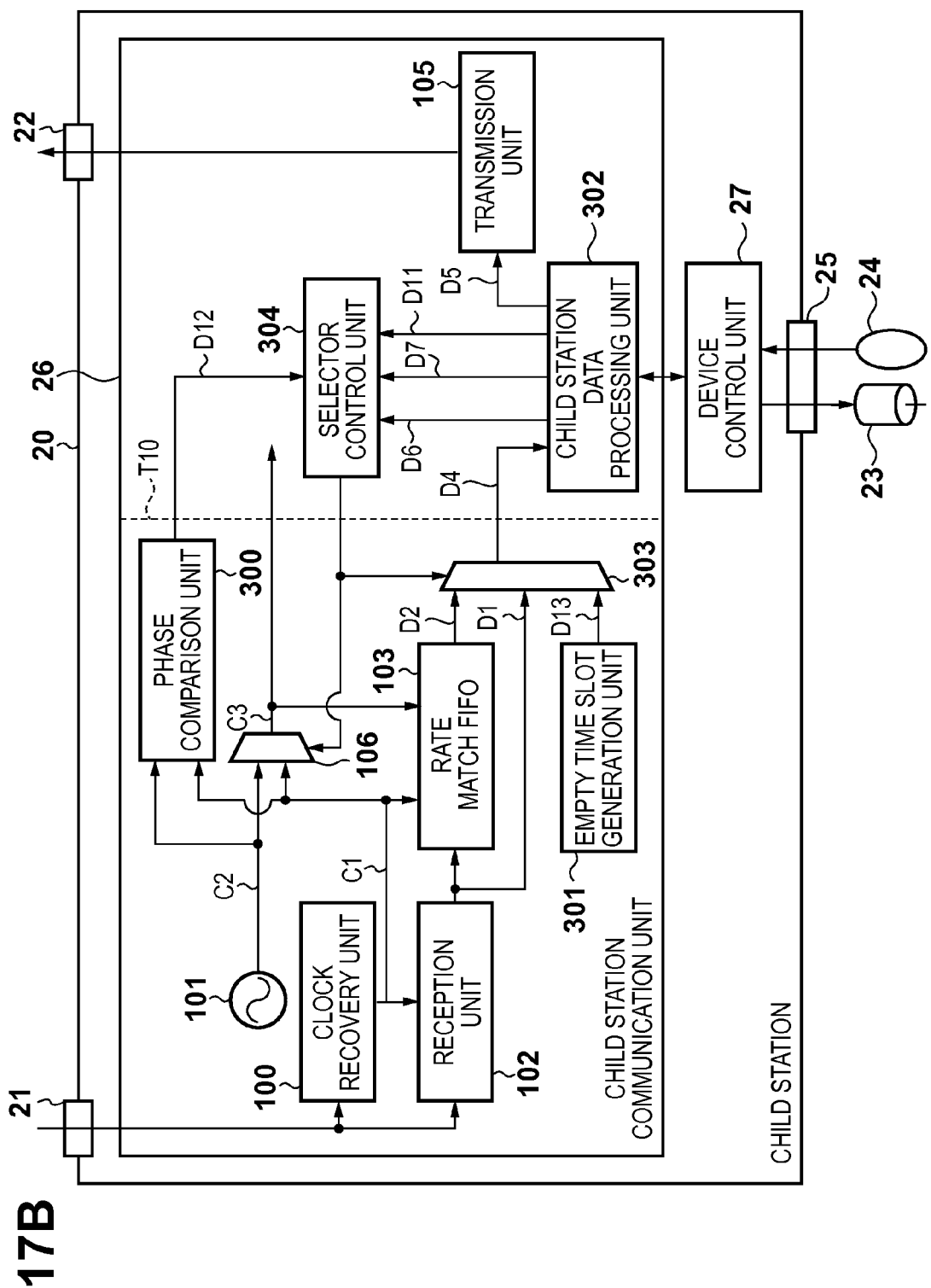

In this embodiment, an arrangement for solving this problem will be described. More specifically, an arrangement capable of switching the synchronization method during the data transmission phase will be explained. FIGS. 17A and 17B are block diagrams showing the internal arrangements of the parent station 10 and a child station 20 according to this embodiment, respectively.

<Arrangement of Parent Station>

FIG. 17A is a block diagram showing the internal arrangement of the parent station 10 according to this embodiment. The arrangement shown in FIG. 17A is the same as in FIG. 3A of the first embodiment, and a description thereof will be omitted.

<Arrangement of Child Station>

FIG. 17B is a block diagram showing the internal arrangement of the child station 20 according to this embodiment. Note that the same reference numerals as in the first embodiment denote blocks that perform the same operations, and a description thereof will be omitted. A child station communication unit 26 of the child station 20 includes a clock recovery unit 100, a local clock oscillation unit 101, a reception unit 102, a rate match FIFO 103, a transmission unit 105, a clock selector 106, a phase comparison unit 300, an empty time slot generation unit 301, a child station data processing unit 302, a reception data selector 303, and a selector control unit 304.

The phase comparison unit 300 detects whether the phase difference between a reproduced clock C1 and a local clock C2 is equal to or smaller than an allowable value, and outputs data D12.

The empty time slot generation unit 301 generates an empty time slot, and outputs data D13 (arbitrary data) having a predetermined length. The child station data processing unit 302 processes various kinds of data. Details will be described later with reference to FIG. 18.

The reception data selector 303 selects one of data D1, D2, and D13, and outputs data D4 (third data) under the control of the selector control unit 304.

In addition to the operation of the first embodiment, upon determining synchronization method switching in the data transmission phase, the selector control unit 304 controls the clock selector 106 and the reception data selector 303 based on data D11 and D12 in accordance with a procedure to be described later.

Figure 18:
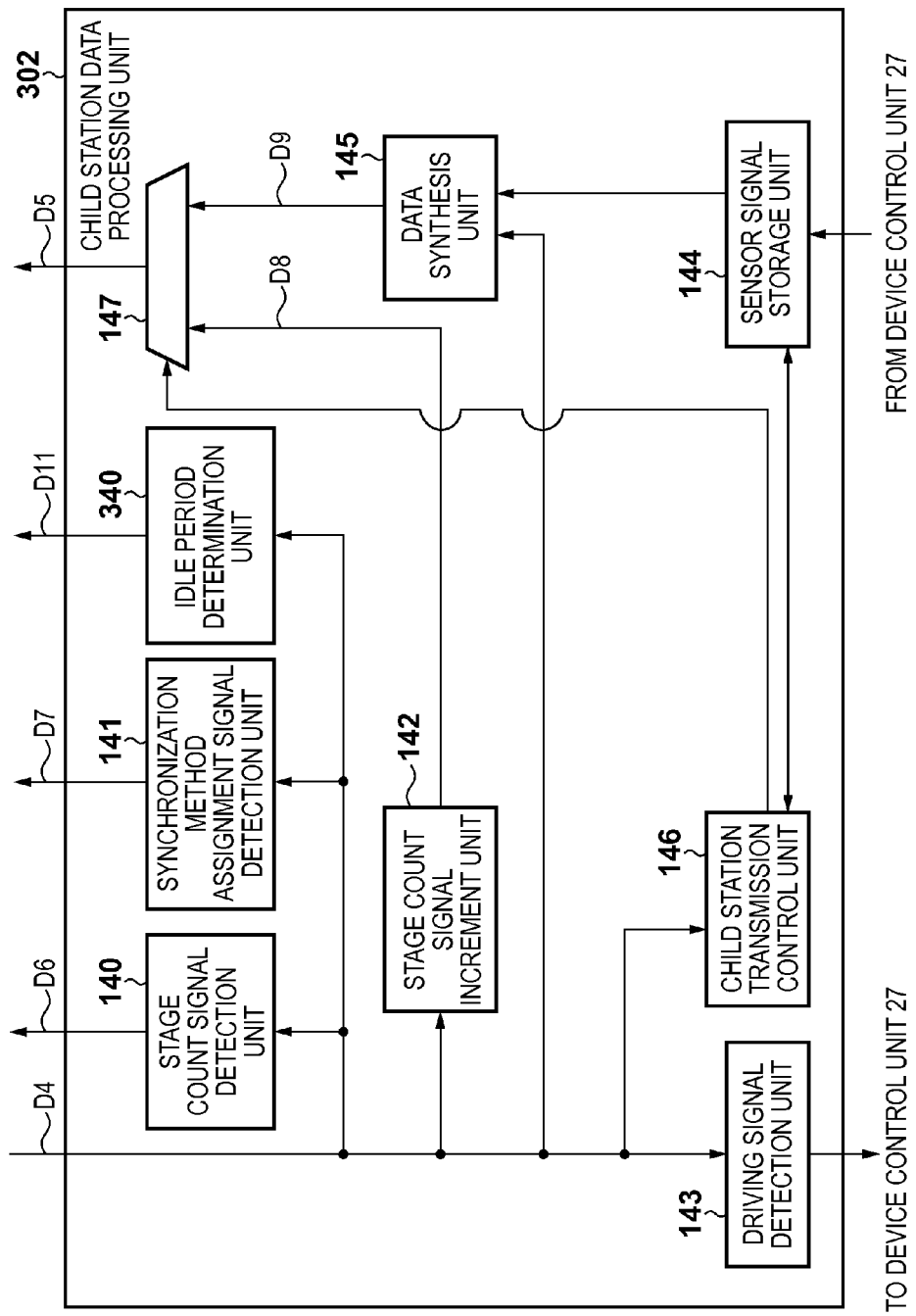
FIG. 18 is a block diagram showing the internal arrangement of a child station data processing unit according to the third embodiment.

FIG. 18 is a block diagram showing the child station data processing unit 302. The child station data processing unit 302 includes a stage count signal detection unit 140, a synchronization method assignment signal detection unit 141, a stage count signal increment unit 142, a driving signal detection unit 143, a sensor signal storage unit 144, a data synthesis unit 145, a child station transmission control unit 146, a transmission data selector 147, and an idle period determination unit 340. The stage count signal detection unit 140, the synchronization method assignment signal detection unit 141, the stage count signal increment unit 142, the driving signal detection unit 143, the sensor signal storage unit 144, the data synthesis unit 145, and the transmission data selector 147 perform the same operations as in the first embodiment, and a description thereof will be omitted. The idle period determination unit 340 determines the idle period in a data transmission frame output from the parent station 10, and outputs the data D11.

<Transmission Control Procedure>

A data transmission control procedure according to this embodiment will be described next. The operations of the initial sequence and the data transmission phase are the same as in the first embodiment, and a description thereof will be omitted. As a characteristic feature of this embodiment, an operation of switching the synchronization method during the data transmission phase will be explained here. Note that in this embodiment as well, the allowable number of relay stations is assumed to be 3.

An operation to be performed when the network topology switches from FIG. 16A to FIG. 16B during the data transmission phase will be described. Note that the network topology switching is assumed to be done during the idle period to prevent destruction of valid data. Child stations 20H, 20I, 20J, 20K, and 20L immediately after switching from FIG. 16A to FIG. 16B employ the independent synchronization method. These child stations employ the independent synchronization method because they can perform clock synchronization, frame synchronization, and time slot synchronization by the synchronization signal and immediately join the communication. If the child stations 20H, 20I, 20J, 20K, and 20L employ the slave synchronization method, the number of stages exceeds the allowable number of connectable stages. For this reason, the child stations connected to the network immediately after the network topology switching, like the child stations 20H, 20I, 20J, 20K, and 20L, employ the independent synchronization method.

Immediately after switching from FIG. 16A to FIG. 16B, a parent station transmission control unit 123 of the parent station 10 controls a various signal generation unit 124 to insert and output a stage count signal using an arbitrary empty time slot of the data transmission frame.

Upon detecting the stage count signal, the child station transmission control unit 146 of the child station data processing unit 302 of the child station 20 controls the transmission data selector 147 to output, as data D5, data D8 output from the stage count signal increment unit 142, as in the first embodiment. The stage count signal increment unit 142 increments the stage count signal by one, and outputs it.

Upon detecting the stage count signal output from the parent station 10, the stage count signal detection unit 140 of the child station data processing unit 302 outputs the numerical value of the stage count signal as data D6, as in the first embodiment. Upon receiving the data D6, the selector control unit 304 stores the numerical value as the value of the number of relay stations. With the above-described operation, the selector control unit 109 of each child station newly stores the number of relay stations from the parent station 10 in FIG. 16B during the data transmission phase.

Upon detecting the stage count signal that has passed through all the child stations and returned, the child station relay station count storage unit 130 of the parent station data processing unit 104 of the parent station 10 decrements the numerical value of the stage count signal by one and stores it, as in the first embodiment. In this embodiment, the total number of child stations 20 connected to the network is assumed to be N+2, that is, larger than that in FIG. 16A by 2. Hence, the child station relay station count storage unit 130 stores the numerical value N+2.

A synchronization method determination unit 132 grasps the total number of child stations 20 from the numerical value information stored in the child station relay station count storage unit 130 and an allowable relay station count storage unit 131, and decides the synchronization method of each child station, as in the first embodiment. In this embodiment, the allowable number of relay stations is 3. For this reason, the synchronization method determination unit 132 decides that the child stations 20C, 20J, . . . that are relay stations corresponding to numbers of integer multiples of 3 should employ the independent synchronization method, and the remaining child stations (child stations 20A, 20B, 20H, 20I, 20K, 20L, . . . ) should employ the slave synchronization method. Note that child stations not corresponding to integer multiple of the allowable number of relay stations but corresponding to positions based on another rule may be decided to employ the independent synchronization method.

Upon detecting the stage count signal that has passed through all the child stations and returned, the parent station transmission control unit 123 controls the various signal generation unit 124 to output a synchronization method assignment signal using an arbitrary empty time slot of the data transmission frame. In this embodiment, table information shown in FIG. 19 is output as the synchronization method assignment signal. Note that instead of transmitting the table information shown in FIG. 19 using one data transmission frame, the table information may be transmitted divisionally to, for example, transmit information about the synchronization method of one child station using one data transmission frame.

Upon detecting the synchronization method assignment signal output from the parent station 10, the synchronization method assignment signal detection unit 141 of the child station data processing unit 302 of the child station 20 outputs the synchronization method assignment signal as data D7, as in the first embodiment. Upon receiving the data D7, the selector control unit 304 stores the table information input to the synchronization method assignment signal. In this embodiment, the table information shown in FIG. 19 is stored. The selector control unit 304 determines the synchronization method to be employed by the local station based on the table information and the value of the number of relay stations stored in step S10. For example, the child station 20A determines to employ the slave synchronization method because the value of the number of relay stations is 1. The child station I determines to employ the independent synchronization method because the value of the number of relay stations is 6.

<Switching from Independent Synchronization Method to Slave Synchronization Method>

The operation of a child station that switches from the independent synchronization method to the slave synchronization method during the data transmission phase, like the child stations 20H, 20I, 20K, and 20L, will be described with reference to FIGS. 20A and 20B. FIG. 20A shows the reproduced clock C1, the local clock C2, a transmission clock C3, and the data D1, D2, D3, D11, and D12 in a child station that switches from the independent synchronization method to the slave synchronization method during the data transmission phase. The description will be made with reference to FIG. 20A assuming that the synchronization method assignment signal concerning the local station is transmitted in the first time slot of a data transmission frame A. Note that a period t1 in FIG. 20A represents a delay time generated when passing through the rate match FIFO. Hence, a delay difference corresponding to the period t1 is generated between the data D1 that does not pass through the rate match FIFO and the data D2 that passes through, as shown in FIG. 20A. At the start of the data transmission frame, the rate match FIFO is assumed to buffer P bits.

Note that the data D11 is a signal output from the idle period determination unit 340. HIGH is output during the idle period, and LOW is output during other periods. The data D12 is a signal output from the phase comparison unit 300. HIGH is output during a period where the phase difference between the reproduced clock C1 and the local clock C2 is equal to or smaller than the allowable value, and LOW is output during other periods. The allowable value is assumed to be a phase difference range that allows to transmit data to a lower terminal station without any data error even when the transmission clock C3 is switched from the reproduced clock C1 to the local clock C2 or from the local clock C2 to the reproduced clock C1.

At time T1, the child station employs the independent synchronization method. For this reason, the local clock C2 is selected as the transmission clock C3, and the data D2 is selected as the data D3, as shown in FIG. 20A.

At time T2, the selector control unit 304 is assumed to determine to switch from the independent synchronization method to the slave synchronization method by the synchronization method assignment signal transmitted by the first time slot. However, the synchronization method switching control is not performed yet at this point of time.

At time T3, the selector control unit 304 detects that the data D12 is HIGH. The selector control unit 304 determines based on the detection result that the phase difference between the reproduced clock C1 and the local clock C2 at the current time is equal to or smaller than the allowable value. The selector control unit 304 controls the clock selector 106 to switch the transmission clock C3 from the local clock C2 to the reproduced clock C1 at the time T3. FIG. 20B is an enlarged view of a dotted range A in FIG. 20A. The reproduced clock C1 and the local clock C2 are thus switched to ensure the continuity of the phase of the transmission clock C3 and prevent the lower station from causing a data error. However, the selector control unit 304 does not control the reception data selector 303 at this point of time. This is because if the data D3 is switched from the data D2 to the data D1 at this point of time, the seventh and eighth time slots break, as can be seen from FIG. 20A. Hence, the selector control unit 304 controls the reception data selector 303 to maintain selecting the data D2 as the data D3 during the time from the time T3 to time T4 to be described later.

At the time T4, the selector control unit 304 detects that the data D11 is HIGH. The selector control unit 304 determines based on the detection result that the current time falls within the idle period, and controls the reception data selector 303 to switch the data D3 from the data D2 to the data D1 at the time T4. The data is switched during the idle period, thereby preventing the time slot including valid data from breaking.

With the above-described procedure, the selector control unit 304 controls the clock selector 106 and the reception data selector 303, thereby switching from the independent synchronization method to the slave synchronization method, as shown in FIG. 16C, during the data transmission phase without causing a data error.

Note that in this embodiment, an arrangement for switching data during the idle period of a data transmission frame has been described. However, the present invention is not limited to this. The switching may be done during any other period as long as no valid data is transmitted.

<Switching from Slave Synchronization Method to Independent Synchronization Method>

The operation of a child station that switches from the slave synchronization method to the independent synchronization method during the data transmission phase, like the child station 20G shown in FIG. 16C, will be described next with reference to FIGS. 21A and 21B. FIG. 21A shows the reproduced clock C1, the local clock C2, the transmission clock C3, and the data D1, D2, D3, D11, and D12 in a child station that switches from the slave synchronization method to the independent synchronization method during the data transmission phase. The description will be made with reference to FIG. 21A assuming that the synchronization method assignment signal concerning the local station is transmitted in the first time slot of the data transmission frame A, as in FIGS. 20A and 20B.

At time T5, the child station employs the slave synchronization method. For this reason, the reproduced clock C1 is selected as the transmission clock C3, and the data D1 is selected as the data D3, as shown in FIG. 21A.

At time T6, the selector control unit 304 is assumed to determine to switch from the slave synchronization method to the independent synchronization method by the synchronization method assignment signal transmitted by the first time slot. However, the synchronization method switching control is not performed yet at this point of time.

At time T7, the selector control unit 304 detects that the data D12 is HIGH. The selector control unit 304 determines based on the detection result that the phase difference between the reproduced clock C1 and the local clock C2 at the time T7 is equal to or smaller than the allowable value. The selector control unit 304 controls the clock selector 106 to switch the transmission clock C3 from the reproduced clock C1 to the local clock C2 at the time T7. FIG. 21B is an enlarged view of a dotted range B in FIG. 21A. The reproduced clock C1 and the local clock C2 are thus switched to ensure the continuity of the phase of the transmission clock C3 and prevent the lower station from causing a data error. However, the selector control unit 304 does not control the reception data selector 303 at this point of time. This is because if the data D3 is switched from the data D1 to the data D2 at this point of time, the eighth time slot breaks, as can be seen from FIG. 21A. Hence, the selector control unit 304 controls the reception data selector 303 to maintain selecting the data D1 as the data D3 after the eighth time slot has passed through the reception data selector 303.

At the time T8, the eighth time slot wholly passes through the reception data selector 303. The selector control unit 304 controls the reception data selector 303 to switch the data D3 from the data D2 to the data D13 at the time T8. The data D13 is an empty time slot generated by the empty time slot generation unit 301, as described above.

At the time T9, the empty time slot output from the empty time slot generation unit 301 wholly passes through the reception data selector 303. The selector control unit 304 controls the reception data selector 303 to switch the data D3 from the data D13 to the data D2 at the time T9. With the above-described operation, after the empty time slot is inserted from the data D1, the data D3 switches to the data D2.

The reason why the empty time slot needs to be inserted will be described here. The rate match FIFO 103 is provided to absorb the transmission rate difference generated by the frequency deviation between the reproduced clock C1 and the local clock C2, as described above. For this reason, the rate match FIFO 103 needs to buffer data in an amount enough to absorb the transmission rate. More specifically, the rate match FIFO 103 needs to buffer a data amount that does not cause underflow or overflow during the time from the synchronization signal to reception of the next synchronization signal. The empty time slot is inserted to gain time to allow the rate match FIFO 103 to buffer the data amount. Hence, when the number of bits of the empty time slot is Q, Q≥P needs to hold. In addition, the number of bits that can be buffered by the rate match FIFO 103 needs to be equal to or larger than Q+P not to cause overflow. Note that even if Q>P, adjustment is assumed to be performed using the idle period so that the rate match FIFO 103 buffers P bits at the start of the next data transmission frame.

With the above-described procedure, the selector control unit 304 controls the clock selector 106 and the reception data selector 303, thereby switching from the slave synchronization method to the independent synchronization method, as in the child station 20G shown in FIG. 16C, during the data transmission phase without causing a data error.

Note that in this embodiment, the data D13 is an empty time slot. However, the present invention is not limited to this. The data D13 may be an arbitrary identifiable data pattern. For example, it may be a specific bit pattern, or the time slot (the eighth time slot in FIG. 21A) transmitted immediately before may be resent.

Figure 22:
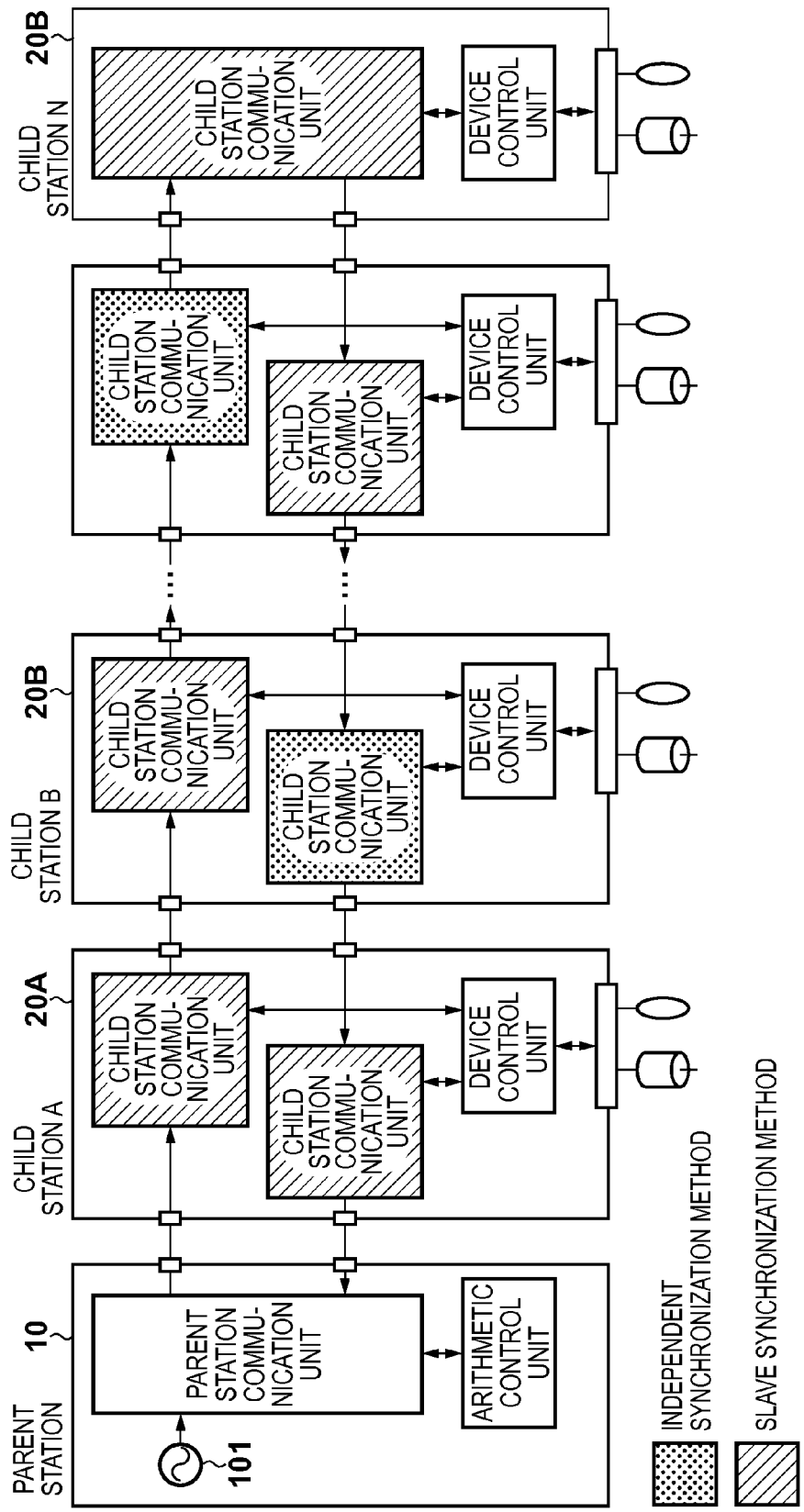
FIG. 22 is a view showing a line-type network configuration.

In the first to third embodiments, the description has been done assuming that the network topology is of a loop connection type. However, the present invention is not limited to this. For example, the network topology may be of a line connection type, as shown in FIG. 22. In FIG. 22, adjacent stations out of the parent station 10 and the child stations 20A, 20B, . . . 20N are connected to each other.

According to the present invention, it is possible to connect a number of child stations to a network while decreasing the total number of cables.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-223454 filed on Oct. 7, 2011, which is hereby incorporated by reference herein in its entirety.

What is claimed is:

1. A communication system including a parent station and a plurality of child stations,
said parent station and said plurality of child stations being line-connected or loop-connected in a plurality of stages, and
said parent station comprising a decision unit configured to decide, based on information representing states of said plurality of child stations, which one a first data relay method of transmitting data to a subsequent station in accordance with a clock reproduced from data received from a preceding station and a second data relay method of transmitting data to the subsequent station in accordance with a local clock generated in a local station should be employed by each of said plurality of child stations.

2. The system according to claim 1, wherein
the information representing the states of said plurality of child stations is the number of relay stations representing the number of child stations that relay data transmitted from said parent station, and
said decision unit decides the relay method to be employed by each of said plurality of child stations based on the number of relay stations and a predetermined allowable number of relay stations.

3. The system according to claim 2, wherein when the number of relay stations exceeds the allowable number of relay stations, said decision unit decides to cause a child station located at a position corresponding to an integer multiple of the allowable number of relay stations to employ the second data relay method and a child station corresponding to another position to employ the first data relay method.

4. The system according to claim 1, wherein
the information representing the states of said plurality of child stations is a data error rate in each of said plurality of child stations, and
said decision unit decides the relay method to be employed by each of said plurality of child stations based on each data error rate and a predetermined allowable value.

5. The system according to claim 4, wherein said decision unit decides to cause a preceding station of a child station whose data error rate exceeds the allowable value to employ the second data relay method.

6. The system according to claim 4, wherein each of said plurality of child stations comprises a measurement unit configured to measure the data error rate in the local station based on a test signal output from said parent station.

7. The system according to claim 6, wherein said measurement unit measures the data error rate in the local station based on a difference between the test signal and a test signal that should originally be received.

8. The system according to claim 1, wherein
the information representing the states of said plurality of child stations is a jitter amount of the reproduced clock in each of said plurality of child stations, and
said decision unit decides the relay method to be employed by each of said plurality of child stations based on each jitter amount and a predetermined allowable value.

9. The system according to claim 8, wherein said decision unit decides to cause a preceding station of a child station whose jitter amount exceeds the allowable value to employ the second data relay method.

10. The system according to claim 1, wherein each child station comprises:
a reception unit configured to receive data received from the preceding station in synchronism with the reproduced clock and output the data as first data;
a first selector unit configured to select one of the local clock and the reproduced clock and output the clock as a transmission clock;
a buffer unit configured to receive the first data in synchronism with the reproduced clock, extract the first data in synchronism with the transmission clock, and output the first data as second data;
a generation unit configured to generate arbitrary data having a predetermined length;
a second selector unit configured to select one of the first data, the second data, and the arbitrary data and output the data as third data;
a selector control unit configured to control said first selector unit and said second selector unit; and
a transmission unit configured to transmit the data to the subsequent station in accordance with the transmission clock,
wherein when the local station employs the second data relay method, and said decision unit decides to change to the first data relay method,
said selector control unit controls said first selector unit and said second selector unit to select the reproduced clock as the transmission clock during a period where a phase difference between the reproduced clock and the local clock is not more than an allowable value and then select the first data as the third data during an idle period where no valid data is transmitted, and
when the local station employs the first data relay method, and said decision unit decides to change to the second data relay method,
said selector control unit controls said first selector unit and said second selector unit to select the local clock as the transmission clock and the arbitrary data as the third data during the period where the phase difference between the reproduced clock and the local clock is not more than the allowable value, and after transmission of the arbitrary data, select the second data as the third data.

11. A method of controlling a communication system including a parent station and a plurality of child stations,
the parent station and the plurality of child stations being line-connected or loop-connected in a plurality of stages, the method comprising:
in the parent station,
deciding, based on information representing states of the plurality of child stations, which one a first data relay method of transmitting data to a subsequent station in accordance with a reproduced clock reproduced from data received from a preceding station and a second data relay method of transmitting data to the subsequent station in accordance with a local clock generated in a local station should be employed by each of the plurality of child stations.

12. A non-transitory computer-readable storage medium storing a computer program that causes a computer to function as a parent station of a communication system of claim 1.

13. A communication system in which a plurality of communication stations are line-connected or loop-connected,
wherein each of the communication stations comprises a switching unit configured to switch between a first data relay method of transmitting data to a subsequent station in accordance with a reproduced clock reproduced from data received from a preceding station and a second data relay method of transmitting data to the subsequent station in accordance with a local clock generated in a local station, and
a communication station that operates as a parent station comprises:
a determination unit configured to determine a topology of the communication system;
a decision unit configured to decide, based on the topology determined by said determination unit, a communication station that uses one of the first data relay method and the second data relay method; and
a notification unit configured to notify the communication station of a decision result by said decision unit.

14. The system according to claim 13, wherein said decision decides, based on a predetermined number of communication stations continuously connected by the first data relay method, the communication station that uses one of the first data relay method and the second data relay method.

15. The system according to claim 14, wherein when the number of communication stations in the communication system exceeds the predetermined number of communication stations continuously connected by the first data relay method, said decision unit decides to cause a communication station located at a position corresponding to an integer multiple of the number to employ the second data relay method and a communication station corresponding to another position to employ the first data relay method.

16. The system according to claim 13, wherein
said determination unit determines a position on the communication system where a data error rate exceeds a predetermined value, and
said decision unit decides, based on the position determined by said determination unit, the communication station that uses one of the first data relay method and the second data relay method.

17. The system according to claim 16, wherein said decision unit decides to cause a preceding station of a communication station whose data error rate exceeds the predetermined value to employ the second data relay method.

18. The system according to claim 16, wherein each of the communication stations comprises a measurement unit configured to measure the data error rate in the local station based on a received test signal.

19. The system according to claim 18, wherein said measurement unit measures the data error rate in the local station based on a difference between the received test signal and a test signal that should originally be received.

20. The system according to claim 16, wherein said decision unit decides, based on a jitter amount of the reproduced clock in the communication station, the communication station that uses one of the first data relay method and the second data relay method.

21. The system according to claim 20, wherein said decision unit decides to cause a preceding station of a communication station whose jitter amount exceeds a predetermined value to employ the second data relay method.

* * * * *